US012728843B2

(12) United States Patent
Byun et al.

(10) Patent No.: US 12,728,843 B2
(45) Date of Patent: Sep. 8, 2026

(54) METHOD AND DEVICE FOR DISPLAYING LIKELIHOOD OF OCCUPYING ROAD SPACE

(71) Applicant: LG ELECTRONICS INC., Seoul (KR)

(72) Inventors: Jaihyun Byun, Seoul (KR); Hanbyul Seo, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/862,411

(22) PCT Filed: Jul. 21, 2023

(86) PCT No.: PCT/KR2023/010594

§ 371 (c)(1),
(2) Date: Nov. 1, 2024

(87) PCT Pub. No.: WO2024/025270

PCT Pub. Date: Feb. 1, 2024

(65) Prior Publication Data

US 2025/0289421 A1 Sep. 18, 2025

(30) Foreign Application Priority Data

Jul. 27, 2022 (KR) ........................ 10-2022-0093399

(51) Int. Cl.

*B60W 30/095* (2012.01)
*G08G 1/16* (2006.01)
*H04W 4/40* (2018.01)

(52) U.S. Cl.

CPC ........... *B60W 30/095* (2013.01); *G08G 1/161* (2013.01); *H04W 4/40* (2018.02); *B60W 2556/45* (2020.02)

(58) Field of Classification Search

CPC ........... B60W 30/095; B60W 2556/45; B60W 30/14; B60W 40/04; B60W 50/0097;

(Continued)

(56) References Cited

U.S. PATENT DOCUMENTS

2017/0021864 A1* 1/2017 Sonntag ............ B60W 30/0956
2017/0270799 A1* 9/2017 Takeda .................. B62D 15/02

(Continued)

FOREIGN PATENT DOCUMENTS

JP 2014137743 A 7/2014
JP 2021056608 A 4/2021

(Continued)

*Primary Examiner* — Daniel M. Robert

(74) *Attorney, Agent, or Firm* — BRYAN CAVE LEIGHTON PAISNER LLP

(57) ABSTRACT

Provided are a method for performing wireless communication by a first device, and an apparatus for supporting same. The method may comprise: obtaining zone configuration information; receiving first information related to an occupancy of a zone by at least one device; obtaining second information related to an occupancy of the zone by one or more devices, based on a sensor of the first device; determining occupancy probability information of the zone, based on the first information and the second information; and transmitting the occupancy probability information.

20 Claims, 19 Drawing Sheets

(58) Field of Classification Search
CPC ............... B60W 50/14; B60W 60/001; B60W 2555/60; G08G 1/161; G08G 1/0112; G08G 1/0116; G08G 1/0133; G08G 1/0145; G08G 1/04; G08G 1/096741; G08G 1/096783; G08G 1/0104; H04W 4/40; H04W 4/70
See application file for complete search history.

(56) References Cited

U.S. PATENT DOCUMENTS

| | | | | |
|---|---|---|---|---|
| 2018/0201272 | A1* | 7/2018 | Takeda | B60W 10/20 |
| 2021/0179098 | A1* | 6/2021 | Lee | B60W 10/20 |
| 2021/0302960 | A1 | 9/2021 | McGill, Jr. et al. | |
| 2023/0095384 | A1* | 3/2023 | Sharma Banjade | G08G 1/096725 701/301 |
| 2025/0100551 | A1* | 3/2025 | Resch | B60W 40/08 |

FOREIGN PATENT DOCUMENTS

| | | | | | |
|---|---|---|---|---|---|
| KR | 10-1989102 | B1 | | 6/2019 | |
| KR | 10-2021-0074937 | A | | 6/2021 | |
| WO | 2020257642 | A1 | | 12/2020 | |
| WO | WO-2021052658 | A1 | * | 3/2021 | H04W 4/44 |
| WO | WO-2022205243 | A1 | * | 10/2022 | B60W 30/18163 |

* cited by examiner

Zone #1 (501)
Zone #2 (502)
Zone #3 (503)
Zone #4 (504)
Zone #5 (505)
Zone #6 (506)
Zone #7 (507)
Zone #8 (508)
Zone #9 (509)
Zone #10 (510)

Single sub-maneuver

Figure 11:
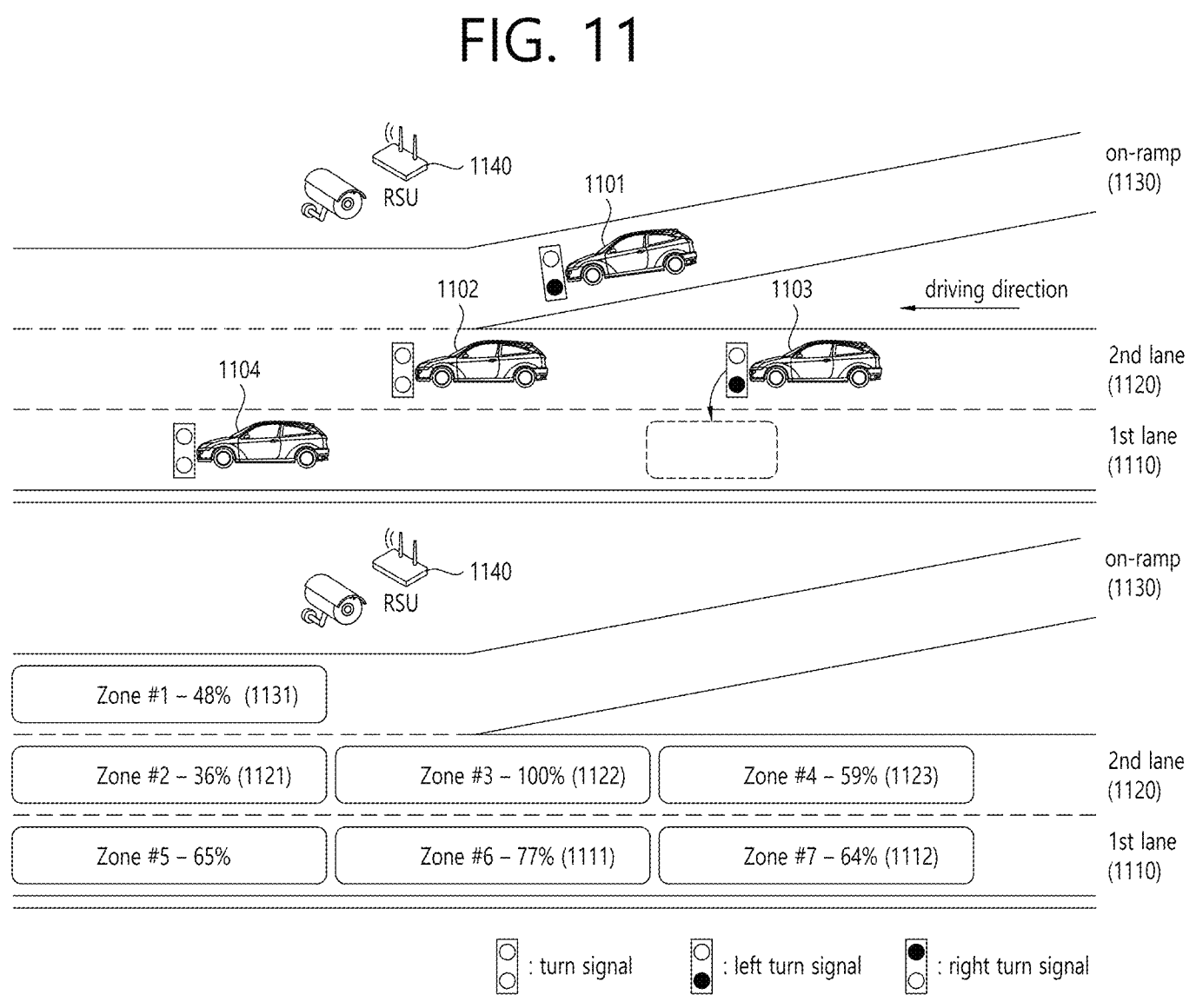

FIG. 11 on-ramp (1130)
2nd lane (1120)
1st lane (1110)
driving direction
1140
RSU
1101
1102
1103
1104 on-ramp (1130)
2nd lane (1120)
1st lane (1110)
1140
RSU
Zone #1 – 48% (1131)
Zone #2 – 36% (1121)
Zone #3 – 100% (1122)
Zone #4 – 59% (1123)
Zone #5 – 65%
Zone #6 – 77% (1111)
Zone #7 – 64% (1112)

: turn signal
: left turn signal
: right turn signal

FIG. 13

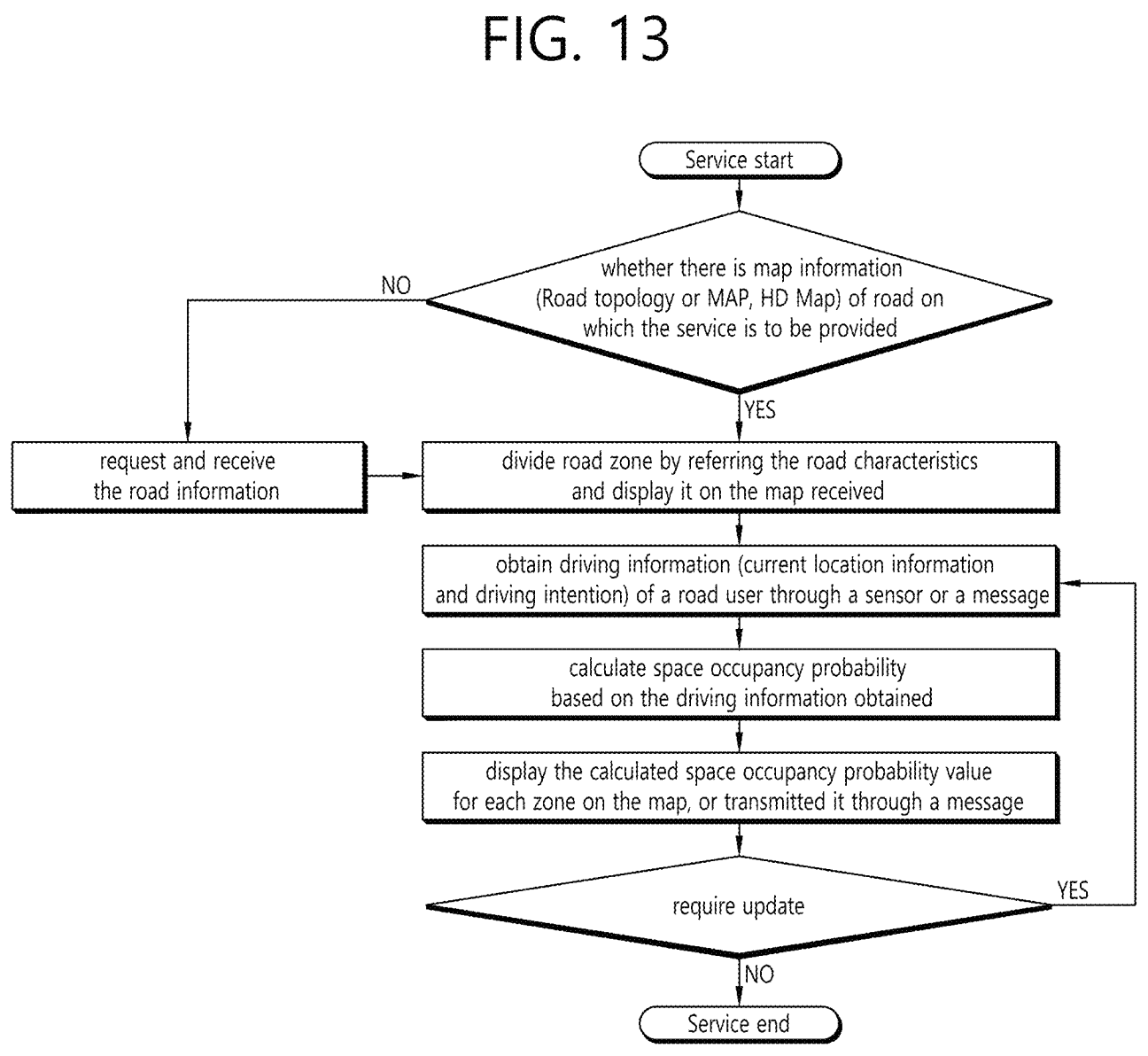

Service start whether there is map information (Road topology or MAP, HD Map) of road on which the service is to be provided

NO

YES request and receive the road information divide road zone by referring the road characteristics and display it on the map received obtain driving information (current location information and driving intention) of a road user through a sensor or a message calculate space occupancy probability based on the driving information obtained display the calculated space occupancy probability value for each zone on the map, or transmitted it through a message require update

YES

NO

Service end

Figure 21:
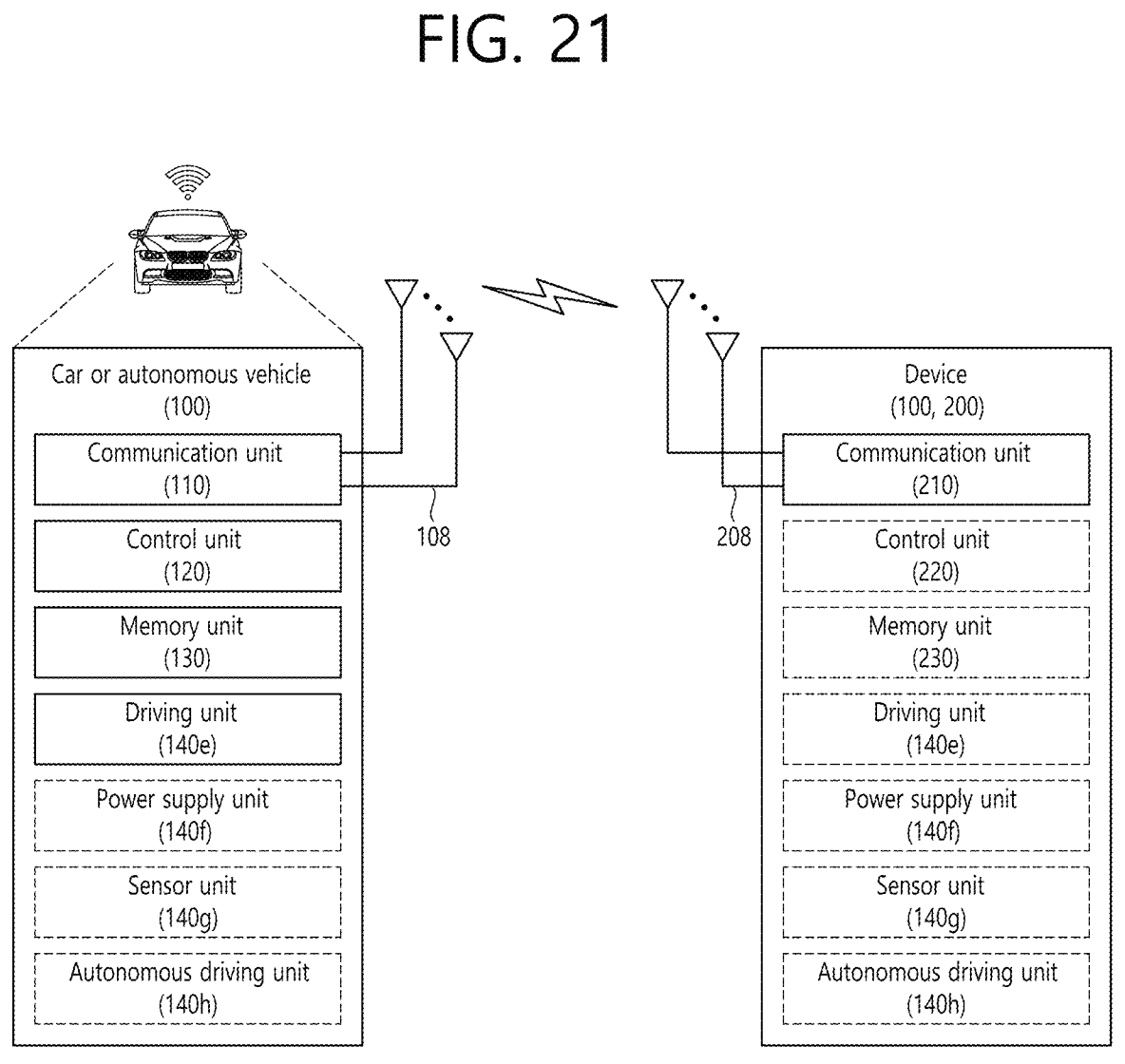

Car or autonomous vehicle (100)
Communication unit (110)
Control unit (120)
Memory unit (130)
Driving unit (140e)
Power supply unit (140f)
Sensor unit (140g)
Autonomous driving unit (140h)
108

208
Device (100, 200)
Communication unit (210)
Control unit (220)
Memory unit (230)
Driving unit (140e)
Power supply unit (140f)
Sensor unit (140g)
Autonomous driving unit (140h)

METHOD AND DEVICE FOR DISPLAYING LIKELIHOOD OF OCCUPYING ROAD SPACE

CROSS-REFERENCE TO RELATED APPLICATIONS

This application is the National Stage filing under 35 U.S.C. 371 of International Application No. PCT/KR2023/010594 filed on Jul. 21, 2023, which claims the benefit of Korean Patent Application No. 10-2022-0093399 filed on Jul. 27, 2022, which is hereby incorporated by reference herein in its entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of a base station. SL communication is under consideration as a solution to the overhead of a base station caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

In one embodiment, provided is a method for performing wireless communication by a first device. The method may comprise: obtaining zone configuration information; receiving first information related to an occupancy of a zone by at least one device; obtaining second information related to an occupancy of the zone by one or more devices, based on a sensor of the first device; determining occupancy probability information of the zone, based on the first information and the second information; and transmitting the occupancy probability information.

In one embodiment, provided is a first device configured to perform wireless communication. The first device may comprise: at least one transceiver; at least one processor; and at least one memory connected to the at least one processor and storing instructions. For example, the instructions, based on being executed by the at least one processor, cause the first device to perform operations comprising: obtaining zone configuration information; receiving first information related to an occupancy of a zone by at least one device; obtaining second information related to an occupancy of the zone by one or more devices, based on a sensor of the first device; determining occupancy probability information of the zone, based on the first information and the second information; and transmitting the occupancy probability information.

In one embodiment, provided is a processing device configured to control a first device. The processing device may comprise: at least one processor; and at least one memory connected to the at least one processor and storing instructions. For example, the instructions, based on being executed by the at least one processor, cause the first device to perform operations comprising: obtaining zone configuration information; receiving first information related to an occupancy of a zone by at least one device; obtaining second information related to an occupancy of the zone by one or more devices, based on a sensor of the first device; determining occupancy probability information of the zone, based on the first information and the second information; and transmitting the occupancy probability information.

In one embodiment, provided is a non-transitory computer-readable storage medium recording instructions. For example, the instructions, based on being executed, cause a first device to perform operations comprising: obtaining zone configuration information; receiving first information related to an occupancy of a zone by at least one device; obtaining second information related to an occupancy of the zone by one or more devices, based on a sensor of the first device; determining occupancy probability information of the zone, based on the first information and the second information; and transmitting the occupancy probability information.

BRIEF DESCRIPTION OF THE DRAWINGS

FIG. 1 shows a communication structure that can be provided in the 6G system, based on an embodiment of the present disclosure.

FIG. 5 shows an example of dividing sections of three-lane road with an on-ramp that merges into the road, based on an embodiment of the present disclosure.

FIG. 11 shows a method for displaying road space occupancy possibility on a highway, based on an embodiment of the present disclosure.

FIG. 13 shows a flow chart of a method for displaying road space occupancy possibility, based on an embodiment of the present disclosure.

FIG. 21 shows a vehicle or an autonomous vehicle, based on an embodiment of the present disclosure.

DETAILED DESCRIPTION

Figure 2:
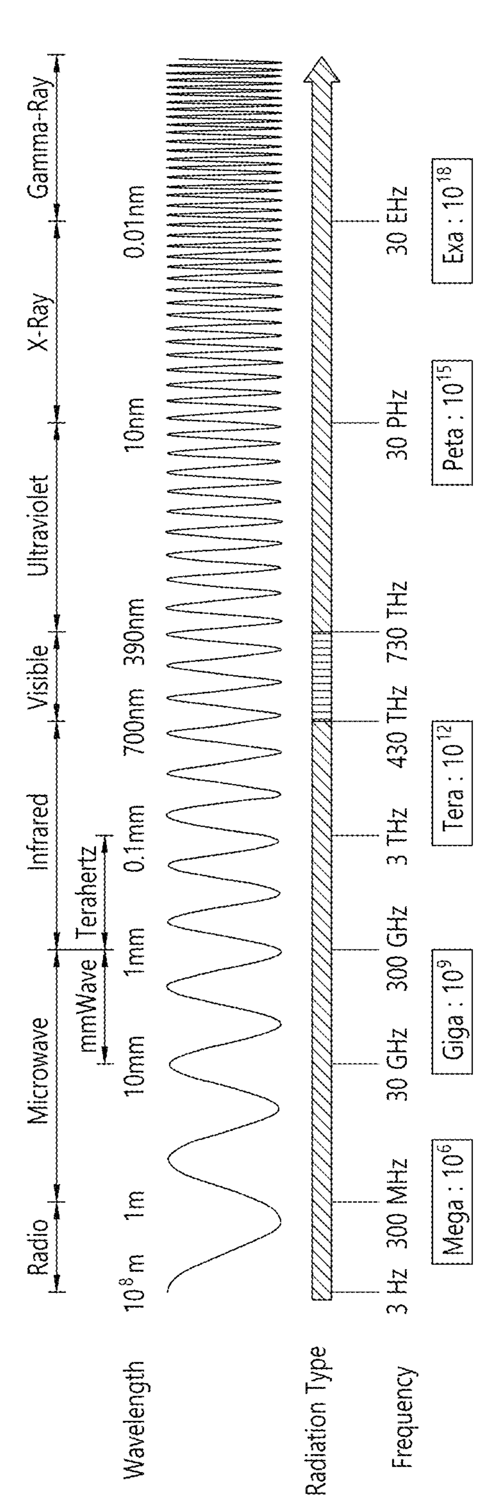
FIG. 2 shows an electromagnetic spectrum, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or predefined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

The 6G (wireless communication) system is aimed at (i) very high data rates per device, (ii) a very large number of connected devices, (iii) global connectivity, (iv) very low latency, (v) lower energy consumption for battery-free IoT devices, (vi) ultra-reliable connectivity, and (vii) connected intelligence with machine learning capabilities. The vision of the 6G system can have four aspects: intelligent connectivity, deep connectivity, holographic connectivity, and ubiquitous connectivity, and the 6G system can satisfy the requirements as shown in Table 1 below. In other words, Table 1 is an example of the requirements of a 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

6G systems can have key elements such as enhanced mobile broadband (eMBB), ultra-reliable low latency communications (URLLC), massive machine-to-machine communications (mMTC), AI-integrated communications, tactile internet, high throughput, high network capacity, high energy efficiency, low backhaul and access network congestion, and enhanced data security.

Figure 1:
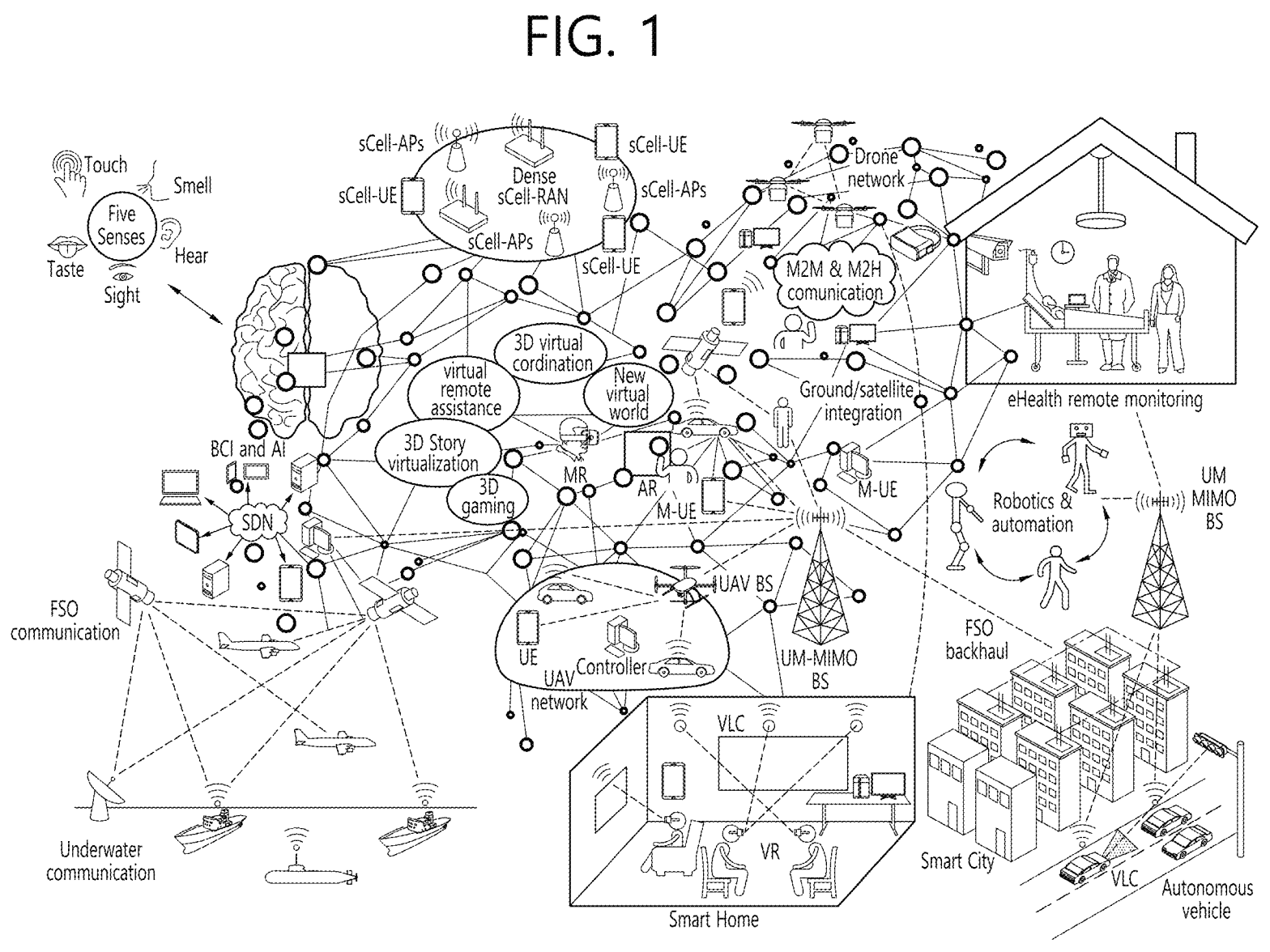

FIG. 1 shows a communication structure that can be provided in the 6G system, based on an embodiment of the present disclosure. The embodiment of FIG. 1 may be combined with various embodiments of the present disclosure.

6G systems are expected to have 50 times higher simultaneous radio connectivity than 5G radio systems. URLLC, a key feature of 5G, will become a more dominant technology in 6G communications, providing end-to-end delay of less than 1 ms. 6G systems will have much better volumetric spectral efficiency as opposed to the more commonly used area spectral efficiency. 6G systems will be able to offer very long battery life and advanced battery technologies for energy harvesting, so mobile devices will not need to be charged separately in a 6G system. New network characteristics in 6G may include the following.

- Satellites integrated network: In order to provide a global mobile population, 6G is expected to be integrated with satellites. The integration of terrestrial, satellite, and airborne networks into a single wireless communication system is critical to 6G.
- Connected intelligence: Unlike previous generations of wireless communication systems, 6G is revolutionary and will update the wireless evolution from "connected things" to "connected intelligence". AI can be applied at each step of the communication process (or each step of signal processing, as we will see later).
- Seamless integration wireless information and energy transfer: 6G wireless networks will transfer power to charge the batteries of devices such as smartphones and sensors. Therefore, wireless information and energy transfer (WIET) will be integrated.
- Ubiquitous super 3D connectivity: Access to networks and core network functions from drones and very low Earth orbit satellites will make super 3D connectivity ubiquitous in 6G.

From the above new network characteristics of 6G, some common requirements may include.

- Small cell networks: The idea of small cell networks was introduced in cellular systems to improve the received signal quality as a result of improved throughput, energy efficiency, and spectral efficiency. As a result, small cell networks are an essential characteristic for 5G and beyond 5G (5 GB) communication systems. Therefore, 6G communication systems will also adopt the characteristics of small cell networks.
- Ultra-dense heterogeneous network: Ultra-dense heterogeneous networks will be another important characteristic of 6G communication systems. Multi-tier networks composed of heterogeneous networks will improve overall QoS and reduce costs.
- High-capacity backhaul: Backhaul connectivity is characterized by high-capacity backhaul networks to support large volumes of traffic. High-speed fiber optics and free-space optics (FSO) systems can be a possible solution to this problem.
- Radar technology integrated with mobile technology: High-precision localization (or location-based services) through communication is one of the features of 6G wireless communication systems. Therefore, radar systems will be integrated with 6G networks.
- Softwarization and virtualization: Softwarization and virtualization are two important features that are fundamental to the design process in a 5 GB network to ensure flexibility, reconfigurability, and programmability. In addition, billions of devices may be shared on a shared physical infrastructure.

The following describes the key enabling technologies for 6G systems.

- Artificial Intelligence: The most important and new technology to be introduced in the 6G system is AI. The 4G system did not involve AI. 5G systems will support partial or very limited AI. However, 6G systems will be AI-enabled for full automation. Advances in machine learning will create more intelligent networks for real-time communication in 6G. The introduction of AI in telecommunications can streamline and improve real-time data transfer. AI can use numerous analytics to determine how complex target tasks are performed, meaning AI can increase efficiency and reduce processing delays. Time-consuming tasks such as handover, network selection, and resource scheduling can be done instantly by using AI. AI can also play an important role in M2M, machine-to-human, and human-to-machine communications. In addition, AI can be a rapid communication in Brain Computer Interface (BCI). AI-based communication systems can be supported by metamaterials, intelligent structures, intelligent networks, intelligent devices, intelligent cognitive radios, self-sustaining wireless networks, and machine learning.
- THz Communication (Terahertz Communication): Data rates can be increased by increasing bandwidth. This can be accomplished by using sub-THz communication with a wide bandwidth and applying advanced massive MIMO technology. THz waves, also known as submillimeter radiation, refer to frequency bands between 0.1 and 10 THz with corresponding wavelengths typically ranging from 0.03 mm-3 mm. The 100 GHz-300 GHz band range (Sub THz band) is considered the main part of the THz band for cellular communications. Adding the Sub-THz band to the mmWave band increases the capacity of 6G cellular communications. Of the defined THz band, 300 GHz-3 THz is in the far infrared (IR) frequency band. The 300 GHZ-3 THz band is part of the optical band, but it is on the border of the optical band, just behind the RF band. Thus, the 300 GHz-3 THz band exhibits similarities to RF. FIG. 2 illustrates an electromagnetic spectrum, according to one embodiment of the present disclosure. The embodiment of FIG. 2 may be combined with various embodiments of the present disclosure. Key characteristics of THz communications include (i) widely available bandwidth to support very high data rates, and (ii) high path loss at high frequencies, for which highly directive antennas are indispensable. The narrow beamwidth produced by highly directive antennas reduces interference. The small wavelength of THz signals allows a much larger number of antenna elements to be integrated into devices and BSs operating in this band. This enables the use of advanced adaptive array techniques that can overcome range limitations.
- Large-scale MIMO Technology (Large-scale MIMO)
- Hologram Beamforming (HBF, Hologram Beamforming)
- Optical wireless technology
- Free-space optical transmission backhaul network (FSO Backhaul Network)
- Non-Terrestrial Networks (NTN)
- Quantum Communication
- Cell-free Communication

- Integration of Wireless Information and Power Transmission
- Integration of Wireless Communication and Sensing
- Integrated Access and Backhaul Network
- Big data Analysis
- Reconfigurable Intelligent Surface (Reconfigurable Intelligent Surface)
- Metaverse
- Block-chain
- Unmanned aerial vehicles (UAVs): Unmanned aerial vehicles (UAVs) or drones will be an important component of 6G wireless communications. In most cases, high-speed data wireless connectivity will be provided using UAV technology. BS entities are installed on UAVs to provide cellular connectivity. UAVs have certain features not found in fixed BS infrastructure, such as easy deployment, strong line-of-sight links, and controlled degrees of freedom for mobility. During emergencies, such as natural disasters, the deployment of terrestrial telecom infrastructure is not economically feasible and sometimes cannot provide services in volatile environments. UAVs can easily handle these situations. UAVs will be a new paradigm in wireless communications. This technology facilitates the three basic requirements of wireless networks, which are eMBB, URLLC, and mMTC. UAVs can also support many other purposes such as enhancing network connectivity, fire detection, disaster emergency services, security and surveillance, pollution monitoring, parking monitoring, accident monitoring, etc. Therefore, UAV technology is recognized as one of the most important technologies for 6G communications.
- Autonomous Driving (Autonomous Driving, Self-driving): For complete autonomous driving, vehicle-to-vehicle communication is required to inform each other of dangerous situations, and vehicle-to-vehicle communication with infrastructure such as parking lots and traffic lights is required to check information such as the location of parking information and signal change times. Vehicle to Everything (V2X), a key element in building an autonomous driving infrastructure, is a technology that enables vehicles to communicate and share information with various elements on the road, such as vehicle-to-vehicle (V2V) and vehicle-to-infrastructure (V2I) wireless communication, in order to perform autonomous driving. In order to maximize the performance of autonomous driving and ensure high safety, fast transmission speeds and low latency technologies are essential. In addition, in the future, autonomous driving will go beyond delivering warnings or guidance messages to the driver to actively intervene in vehicle operation and directly control the vehicle in dangerous situations, so the amount of information that needs to be transmitted and received will be vast, and 6G is expected to maximize autonomous driving with faster transmission speeds and lower latency than 5G.

For clarity of description, 5G NR is mainly described, but the technical idea according to an embodiment of the present disclosure is not limited thereto. Various embodiments of the present disclosure may also be applied to a 6G communication system.

Meanwhile, there are two conventional technologies for displaying space occupancy state on the road.

The first conventional technology is a method of displaying road traffic information. The real-time road traffic information display provided by the current intelligent transportation system (ITS) National Traffic Information Center may be used to identify a wide range of traffic flows, through statistical analysis of traffic flows and information processing. That is, road users may distinguish congested sections or smooth sections when using the road.

The second conventional technology is to divide the road into specific zones and indicate the current road space occupancy state of each zone as two values (e.g., occupied or unoccupied), as specified in the contribution (ITSWG1 (22) 000134) proposed by CANON Research Centre France (CRCF) to European Telecommunication Standards Institute (ETSI) ITS.

Figure 3:
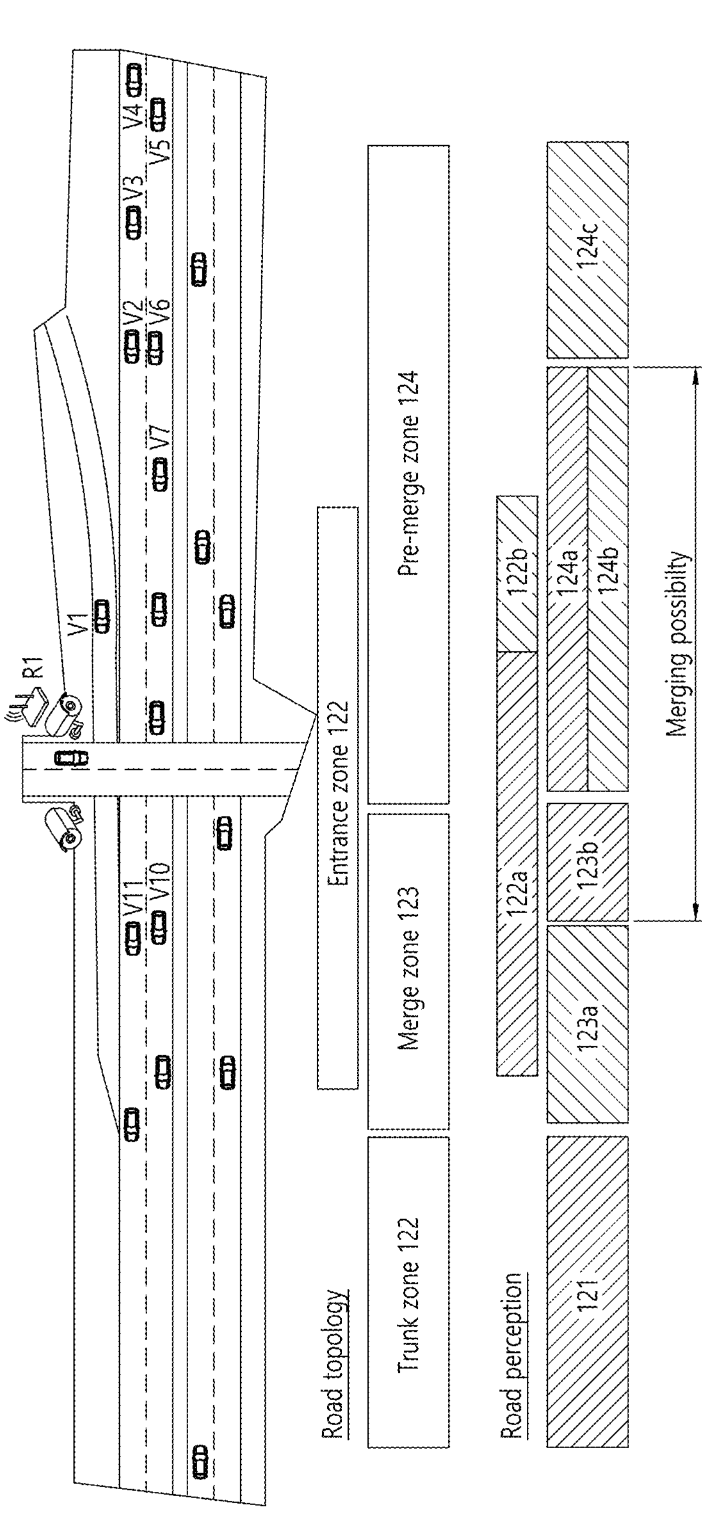
FIG. 3 shows a method for displaying space occupancy state proposed by CRCF.

FIG. 3 shows a method for displaying space occupancy state proposed by CRCF. For example, referring to FIG. 3, a highway entrance may be expressed in the method proposed by the CRCF.

Meanwhile, the problems of the two conventional technologies for displaying road occupancy state described above may be analyzed as follows.

The problem with the first conventional technology, method for displaying the real-time road traffic information, is that although it may be used to identify traffic flows from a current macroscopic perspective, it has limitations in identifying the road space occupancy state of local section. The road expressed in the method for displaying road traffic information does not have lane division, and the information for each section is not precise. That is, the real-time traffic information is a reference information used for configuring the overall route. In a method for displaying road space occupancy possibility in the present disclosure, space occupancy state information of the local section of the road currently being driven may be used as reference information for recognizing surrounding vehicles, avoiding collisions, or changing driving routes.

The problem with the second conventional technology, method for displaying road space occupancy state proposed by the CRCF, is that it can only display the current space occupancy state, and the values that can be displayed are limited to two values (e.g., occupied or unoccupied). That is, the existing method only refers to the current state and cannot infer the space occupancy possibility of future, so road users (e.g., vehicles, pedestrians, etc.) may lack information to avoid collision while driving.

Figure 4:
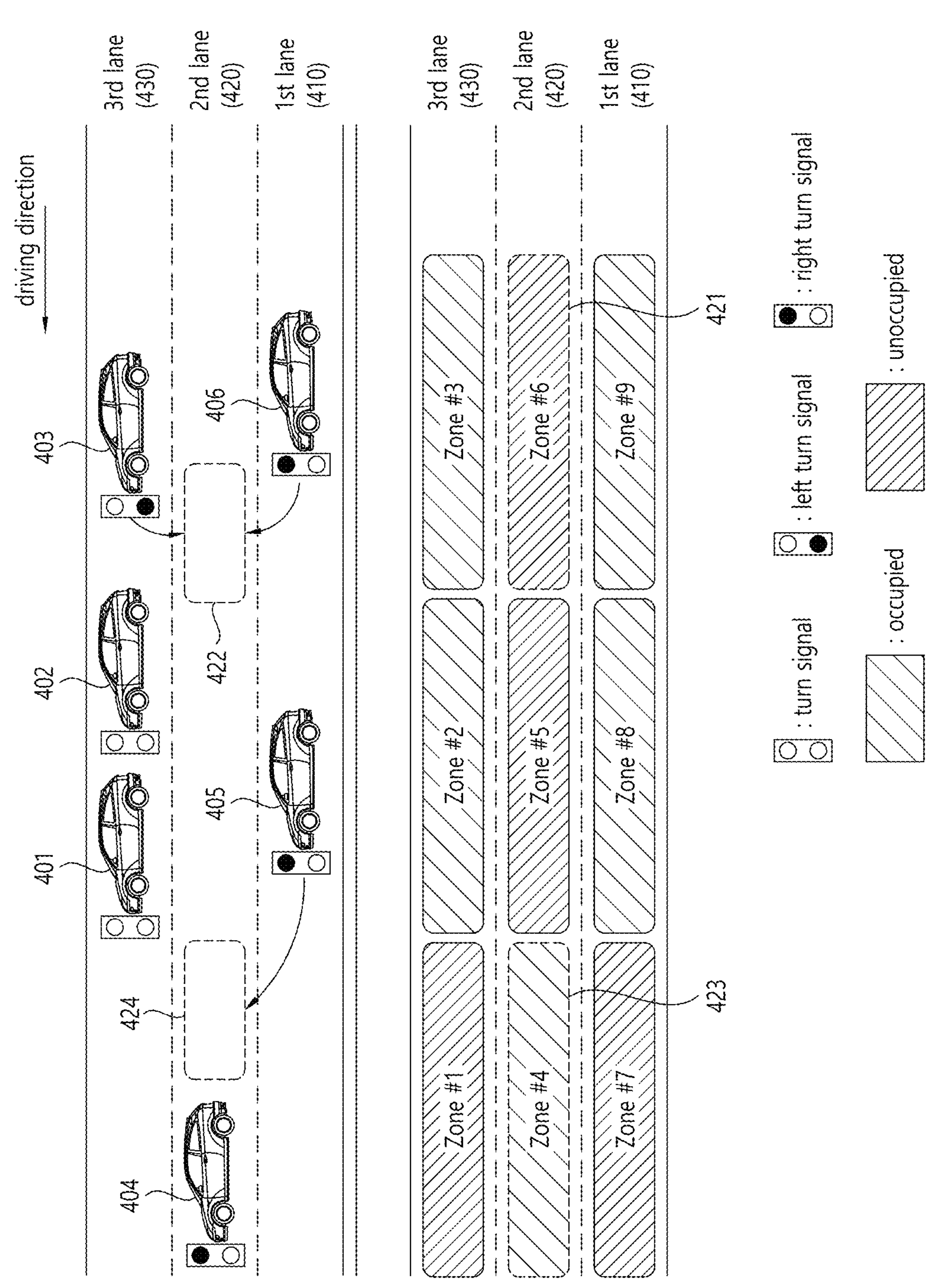
FIG. 4 shows a space occupancy state of road expressed by the method for displaying space occupancy state proposed by CRCF.

FIG. 4 shows a space occupancy state of road expressed by the method for displaying space occupancy state proposed by CRCF. For example, referring FIG. 4, the space occupancy state of vehicles 401 to 406 on the 3 lanes one ways 410 to 406 may be displayed using the method proposed by the CRCF. For example, referring FIG. 4, when a vehicle selects a driving path based on the road space on the road space occupancy state information acquired by the vehicle, if the driving paths of other vehicles are same or intersect at some point, i.e., if both vehicles attempt to enter a currently unoccupied road space, a collision between vehicles may occur.

For example, referring FIG. 4, FIG. 4 may show a vehicle-to-vehicle collision scenario that may occur when vehicles change their driving path to a zone where they wish to change lanes. That is, for example, if a vehicle 406 driving the 1st lane 410 and a vehicle 403 driving the 3rd lane 430 attempt to change lanes to the zone 422 in 2nd lane 420 based on the road occupancy state information 421, there is probability that a collision accident may occur between the vehicles. In addition, for example, although a space is currently occupied, it may be possible to change driving lanes to the space by referencing the current driving information of surrounding vehicles. For example, when a vehicle 405 is driving on the 1st lane 410 and wants to change lanes to a zone 424 in 2nd lane 420, since the zone 424 is occupied based on the road space occupancy information acquired by the vehicle 405, the vehicle 405 may determine that it is not possible to change lanes to the zone 424. However, since the vehicle 404 driving the 2nd lane 420 is driving in the front position of the zone with low risk of collision and is planning to change driving lane to 3rd lane 430, the probability of collision seems to low when changing driving paths between the vehicles 404 and 405. To summarize the problems of the conventional technology proposed by the CRCF, the two detailed examples above for case that arise by displaying road space occupancy as a simplified value that only considers current conditions may be illustrated with FIG. 4.

In the present disclosure, a method and device for displaying the road space occupancy possibility is proposed.

In the present disclosure, a method for calculating the road space occupancy possibility of the current and near-future and transferring and displaying it to the road user is proposed. For example, representatively, it may include that a road side unit (RSU) may detect the current state for driving, the future driving intention, the predicted driving path, or the planned driving path of vehicles by obtaining driving information of the vehicles in motion or stopped (e.g., velocity, direction, or driving lanes, etc.) and information exchange (e.g., turn signals, brake lights, hand signals, or V2X messages, etc.), and transfer and display the road space occupancy possibility to other vehicles based on this.

In the present disclosure, the method for displaying the road space occupancy possibility may be specifically described in four steps as follows. In the present disclosure, the method for displaying the road space occupancy possibility may be specifically described by dividing it into (1) a method for dividing zones of the road, (2) a method for detecting and analyzing the current space occupancy state and driving intention of the road user, (3) a method for calculating the road space occupancy possibility, and (4) a method for displaying the road space occupancy possibility, as follow.

(1) a Method for Dividing Zones of the Road

This is a preliminary process performed to display the road space occupancy possibility, which may display the space occupancy possibility of each zone by dividing zones of the road.

For example, information required to divide the zones of the road may include road topology (e.g., road width, lane information, lane direction, permitted driving direction, etc.) and statistical information of road user in motion (e.g., moving speed, congestion, etc.). For example, the size of the zone may be at least larger than the size of the vehicle, and may be configured to valid size based on the information provided above. For example, there may be various methods to divide the zones. For example, there may be two examples as shown in FIG. 5 and FIG. 6 below.

Figure 5:
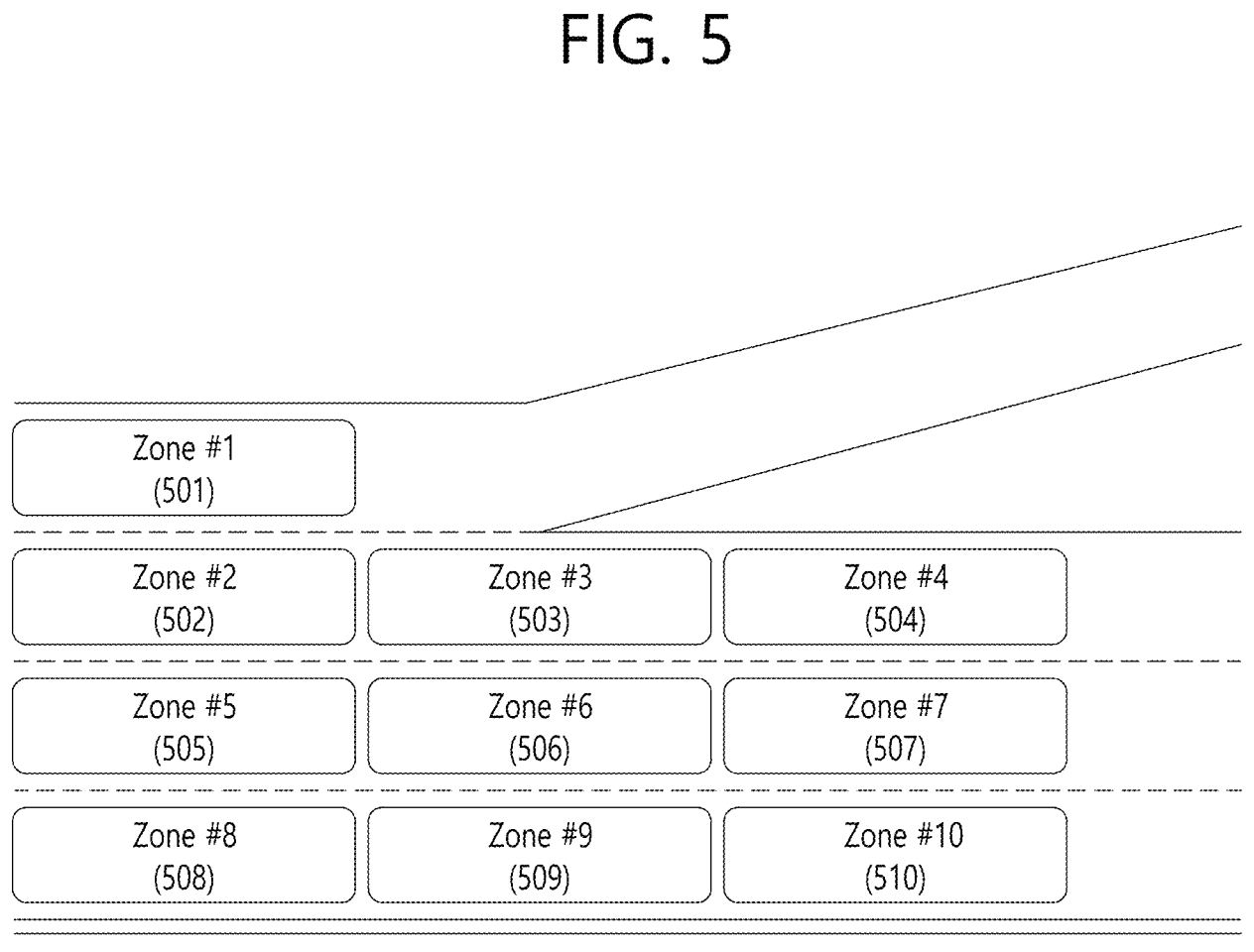

FIG. 5 shows an example of dividing sections of three-lane road with an on-ramp that merges into the road, based on an embodiment of the present disclosure. The embodiment of FIG. 5 may be combined with various embodiments of the present disclosure.

Referring to FIG. 5, zones 501 to 510 may be divided to display the road space occupancy possibility of the road users.

Figure 6:
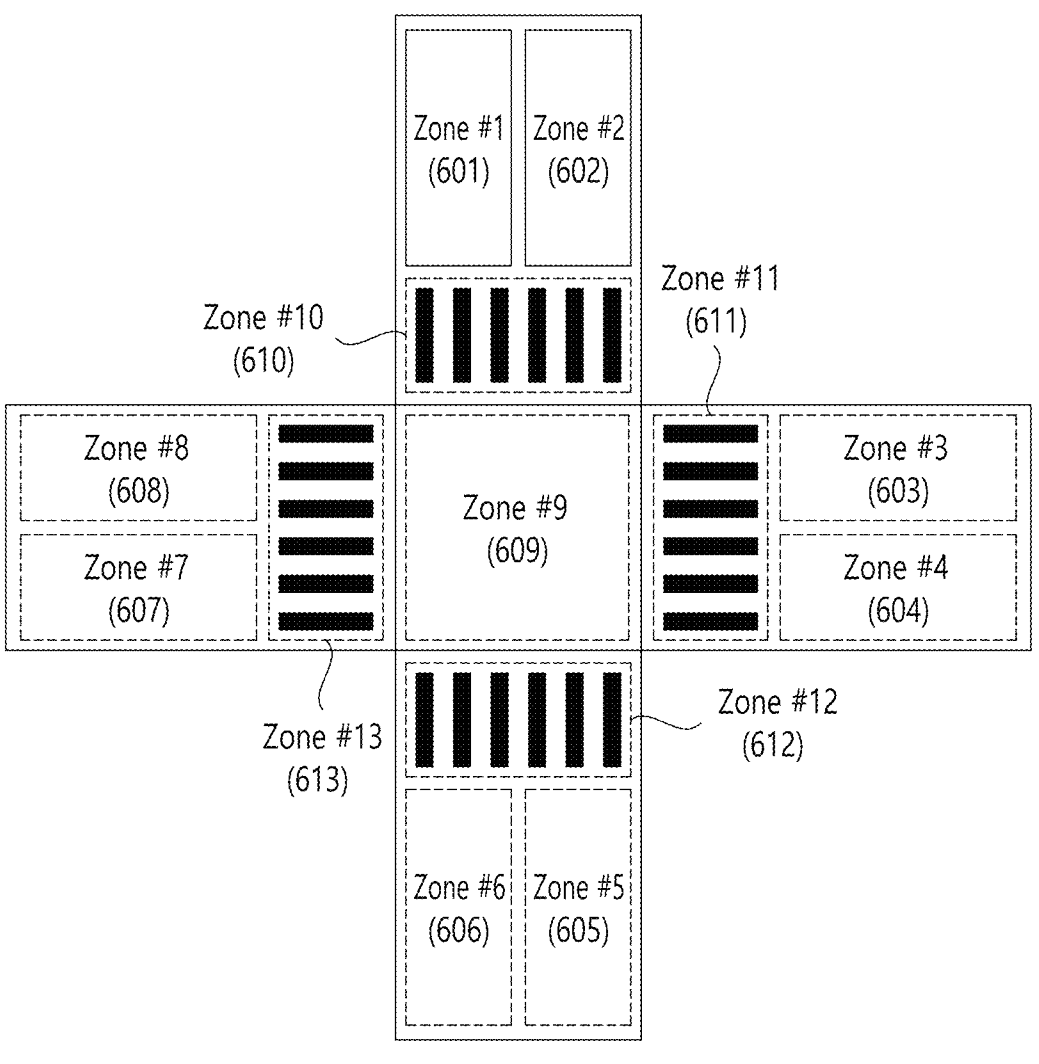
FIG. 6 shows an example of dividing sections of an intersection where both vehicles and pedestrians pass, based on an embodiment of the present disclosure.

FIG. 6 shows an example of dividing sections of an intersection where both vehicles and pedestrians pass, based on an embodiment of the present disclosure. The embodiment of FIG. 6 may be combined with various embodiments of the present disclosure.

Referring to FIG. 6, zones 601 to 609 may be divided to display the road space occupancy possibility of the road users, and zones 610 to 613 may be divided to display the road occupancy possibility of the pedestrians.

For example, another way to divide the zones of the road is to use a costmap. For example, the grid size of the costmap may vary and may be configured by the information provider in an efficient way to configure the information.

(2) a Method for Detecting and Analyzing the Current Space Occupancy State and Driving Intention of the Road User For example, there is a method to check whether there are objects or road users in each zone through a sensor (e.g., camera, radar, lidar, etc.) for detecting the current road space occupancy state. In addition, for example, any road user who can communicate and use intelligent transport system (ITS) service may obtain the current location information, and know the road space occupancy state, through an awareness message (e.g., cooperative awareness message (CAM), vulnerable road user (VAM), basic safety message (BSM), or personal safety message (PSM), etc.). In addition, for example, fixed objects or construction sites that are not the road space occupied by road users may be considered as the current road space occupancy. For example, representatively, from information collected by sensors equipped on the RSU, obstacles that have fallen on the road, construction sites, or parked/stopped vehicles, etc. may be considered as the road space occupancy and displayed. For example, road information and traffic situation information provided by the ITS traffic information center may be utilized. For example, by receiving information such as road maintenance sections or accident sections, drivability information of the zones may be determined and reflected on the road space occupancy state. In addition, for example, road topology information provided by transport authorities, HD map, road signal information (e.g., Signal Phase and Timing (SPaT)) or road maintenance information such as speed limits may be used as a factor in calculating the space occupancy possibility.

For example, one of the means for predicting the road space occupancy in the near-future may be to identify the driving intention of the road user. For example, one of the methods for identifying the driving intention may be to use a sensor. For example, representatively, it may be possible to recognize various things such as turn signals, acceleration, or deceleration and detect approaching the zone, by a camera of the RSU.

Figure 7:
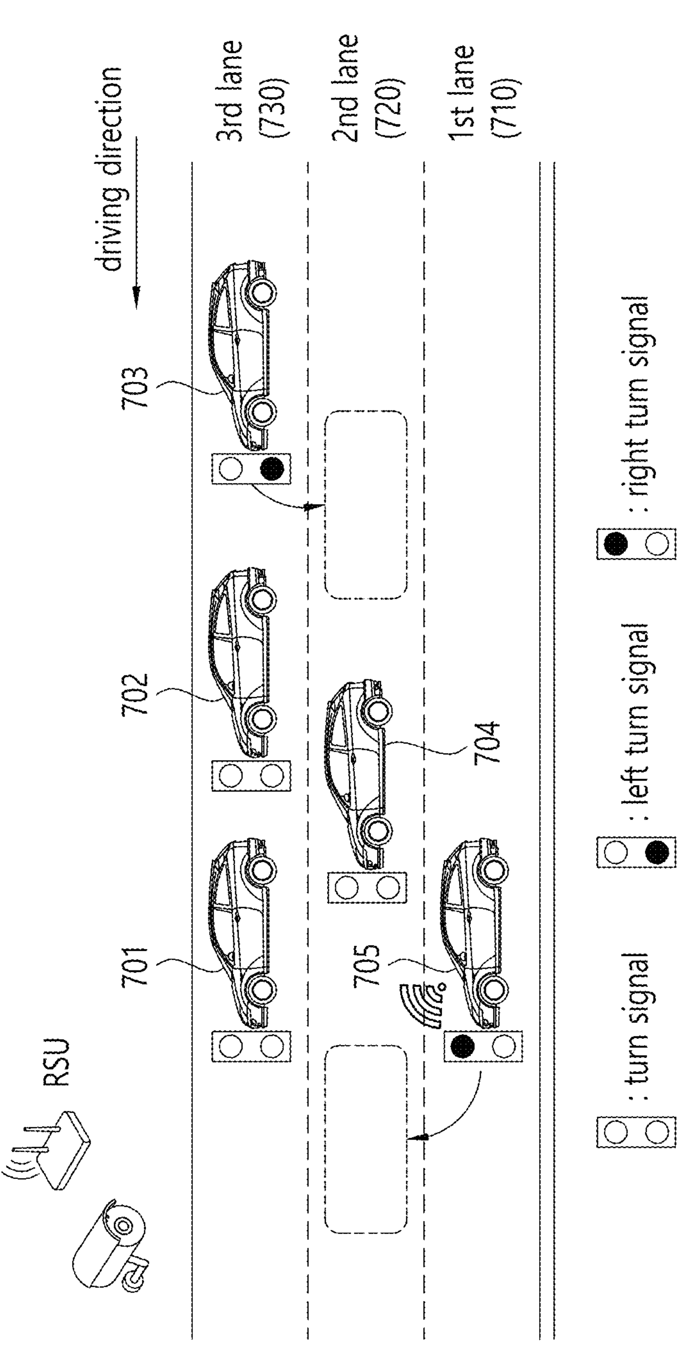
FIG. 7 shows a scenario for identifying driving intention, based on an embodiment of the present disclosure.

FIG. 7 shows a scenario for identifying driving intention, based on an embodiment of the present disclosure. The embodiment of FIG. 7 may be combined with various embodiments of the present disclosure.

Referring to FIG. 7, for example, the driving intention may be identified by an act of the vehicle 704 driving in 2nd lane 720 on the road decelerating down to allow another vehicle 705 attempting to change lanes from 1st lane 710 to 2nd lane 720 or an act of the vehicle 704 accelerating to disallow another vehicle 705 attempting to change lanes from 1st lane 710 to 2nd lane 720.

Figure 8:
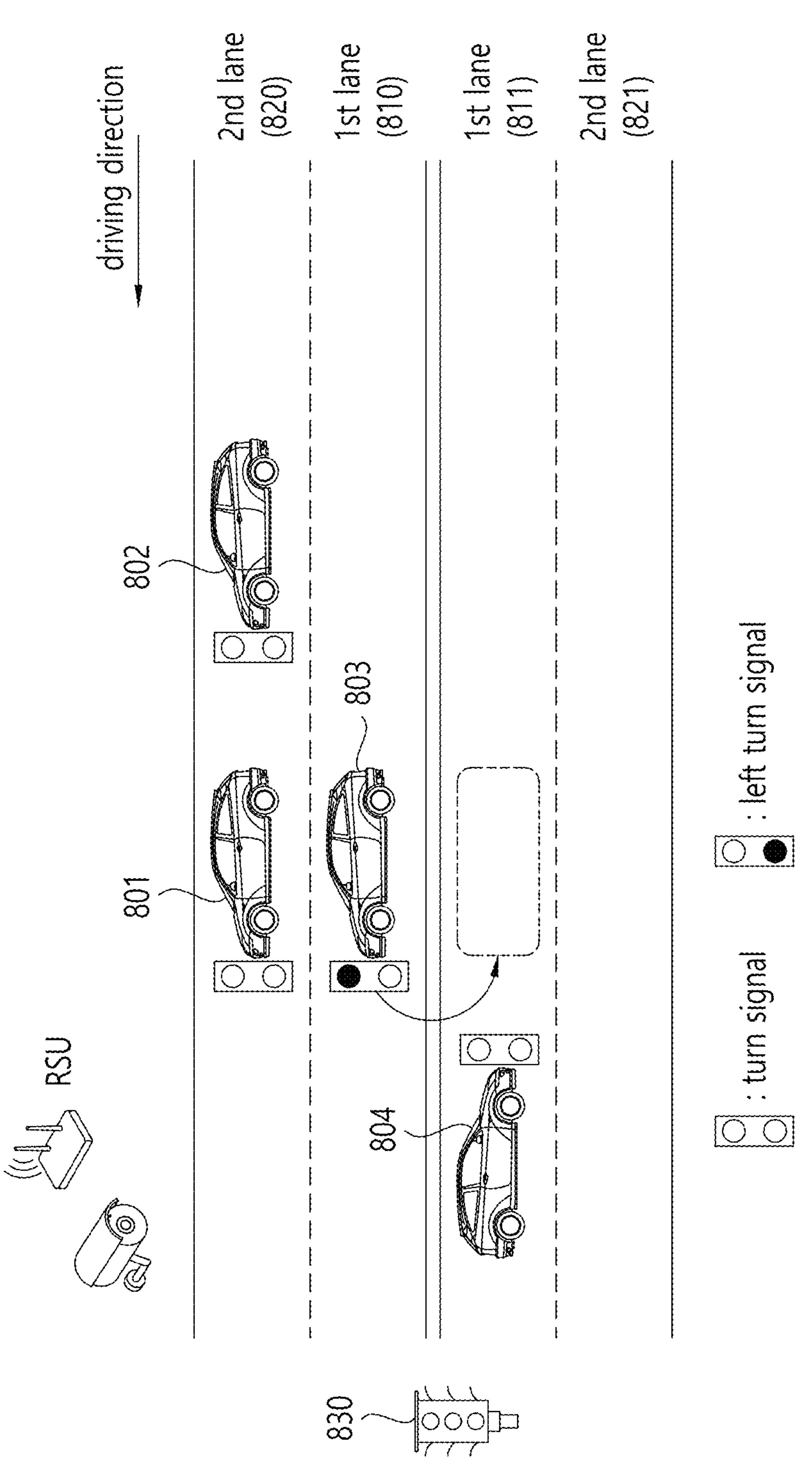
FIG. 8 shows a scenario for identifying driving intention, based on an embodiment of the present disclosure.

FIG. 8 shows a scenario for identifying driving intention, based on an embodiment of the present disclosure. The embodiment of FIG. 8 may be combined with various embodiments of the present disclosure.

Referring to FIG. 8, for example, if the vehicle 803 turns on its left turn signal in the U-turn lane (1st lane 810) and waits, the possibility of the zone (1st lane 811) opposite the center line being occupied after the signal change may increase. For example, if the traffic light information 830 can also be known, the space occupancy possibility of the zone 811 according to the time before the signal change may be expressed as increasing.

For example, static information (e.g., vehicle type information such as vehicle size or type) and dynamic information (e.g., driving information of vehicle such as velocity, acceleration, location, or direction) of the vehicle may be acquired through awareness message from road user who can use V2X service. For example, as an example of utilizing the static information of V2X message, if an emergency vehicle (e.g., ambulance or fire truck, etc.) approaches with broadcasting the awareness message, the space occupancy possibility of the driving path of the emergency vehicle may increase more quickly compared to the space occupancy possibility of the surrounding zones of it occupied by other vehicles. This may have the effect of prioritizing the right of way for the emergency vehicles. In addition, for example, as an example of utilizing the dynamic information of V2X message, the space occupancy possibility of the future may be estimated through a path prediction value.

For example, various driving state information not mentioned above may be included.

In addition, information for space occupancy plan or intention of the vehicle provided by maneuver coordination message (MCM) or maneuver sharing and coordination message (MSCM) may be reflected.

(3) a Method for Calculating the Road Space Occupancy Possibility

For example, the road space occupancy possibility may be functionalized based on the detection and analysis results of the current road space occupancy state and driving intention of the road user described in (2) above, for each divided zone of the road described in (1) above. For example, there are many methods to quantify the road space occupancy possibility, a common example being the use of percentages. For example, the function for calculating the road space occupancy possibility may be expressed as a function equation 1 below.

[function equation 1]

$$P(\text{Zone } A)_{x+1} = (1-\alpha)\cdot P(\text{Zone } A)_x + \alpha\cdot\sum\{P(\text{Zone } A)_{Prediction}\}$$

The $P(\text{Zone A})_x$ term may represent the current road space occupancy possibility value, and the initial value ($P(\text{Zone A})_{x=0}$) may reflect the current space occupancy state.

The $P(\text{Zone A})_{Prediction}$ term may represent the near-future road space occupancy possibility value, and reflect various information detected and analyzed by sensor and V2X message by quantifying them.

In the present disclosure, the α, which is used to define the road space occupancy possibility calculation function, is a value representing a weight ($0\leq\alpha\leq1$), which is used to adjust the ratio of the current road space occupancy possibility and the future road space occupancy possibility. For example, this value (α) may be used being changed according to the characteristics and conditions of the road or the driving environment of the road user. For example, when the speed is 0 to 30 km/h, the α may be configured to 0.3, when the speed is 30 to 60 km/h, the α may be configured to 0.6, and when the speed is 60 km/h or higher, the α may be configured to 0.8. In addition, for example, an update cycle (Δx) may also be adjusted according to the characteristics and conditions of the road or the driving environment of the road user. For example, in low-speed environments such as downtown, it may be configured to 0.3 seconds, and in highway environments, it may be configured to 0.1 seconds.

Or, for example, the current and near-future space occupancy possibility according to the change in time may be expressed with various layers and/or linked structures in time domain. For example, information may also be provided in each time difference such as Δt=0, 0.1, 0.5, or 1 seconds. For example, this may be a method by adding one layer to a layered costmap.

(4) a Method for Displaying the Road Space Occupancy Possibility

For example, the space occupancy possibility values of each zone of the road obtained in (1), (2), or (3) above may be transferred and displayed to the user in various methods. For example, representatively, the zones on the road may be divided in conjunction with road topology information (e.g., MAP or HD Map) provided by ITS infrastructure service, and the road space occupancy possibility values of each zone may be displayed numerically or in color.

For example, if the road user is capable of V2X communication, it may be transmitted through V2X message (e.g., CPM or SDSM). For example, after calculating the road space occupancy possibility proposed in the present disclosure based on information obtained by RSU installed at intersection detecting road users in each zone on the road by using sensor or acquiring by awareness message, it may be included in cooperative perception message (CPM) or sensor data sharing message (SDSM) and transferred to the surrounding road users. For example, based on the information of the message received in this way, the RSU may suggest and induce maneuver coordination to vehicles attempting to change their driving path. That is, taking into account the road space occupancy possibility and state of vehicle attempting to enter the zone, maneuver coordination may be suggested to the vehicle attempting to enter the zone.

Figure 9:
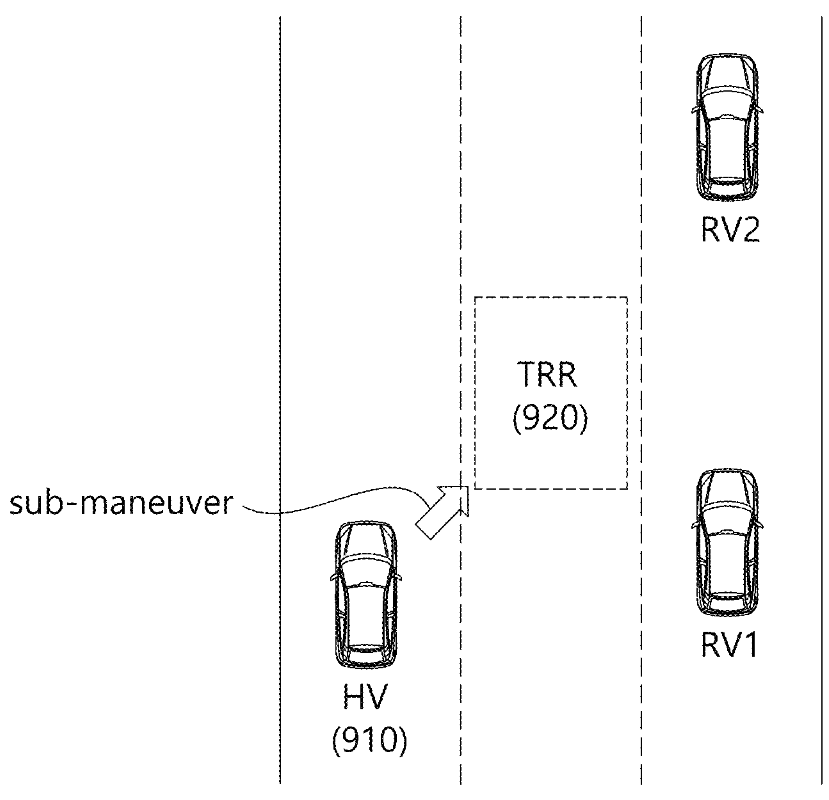
FIG. 9 shows an example of maneuver adjustment of vehicle using road space occupancy possibility information, based on an embodiment of the present disclosure.

FIG. 9 shows an example of maneuver adjustment of vehicle using road space occupancy possibility information, based on an embodiment of the present disclosure. The embodiment of FIG. 9 may be combined with various embodiments of the present disclosure.

Referring to FIG. 9, for example, in the case of maneuver sharing and coordination message (MSCM) of the society of automotive engineers (SAE) standard, considering information for the location (TRR square 920) where the HV 910 is to drive, the space occupancy possibility for that space may be calculated and displayed. For example, this may enable UEs or vehicles that cannot use the MSCM to make a driving plan to avoid collisions using the space occupancy possibility information.

Three embodiments of the present disclosure are described below.

(1) a Method for Displaying the Road Space Occupancy Possibility on the Normal Road (Lane Change Scenario)

Figure 10:
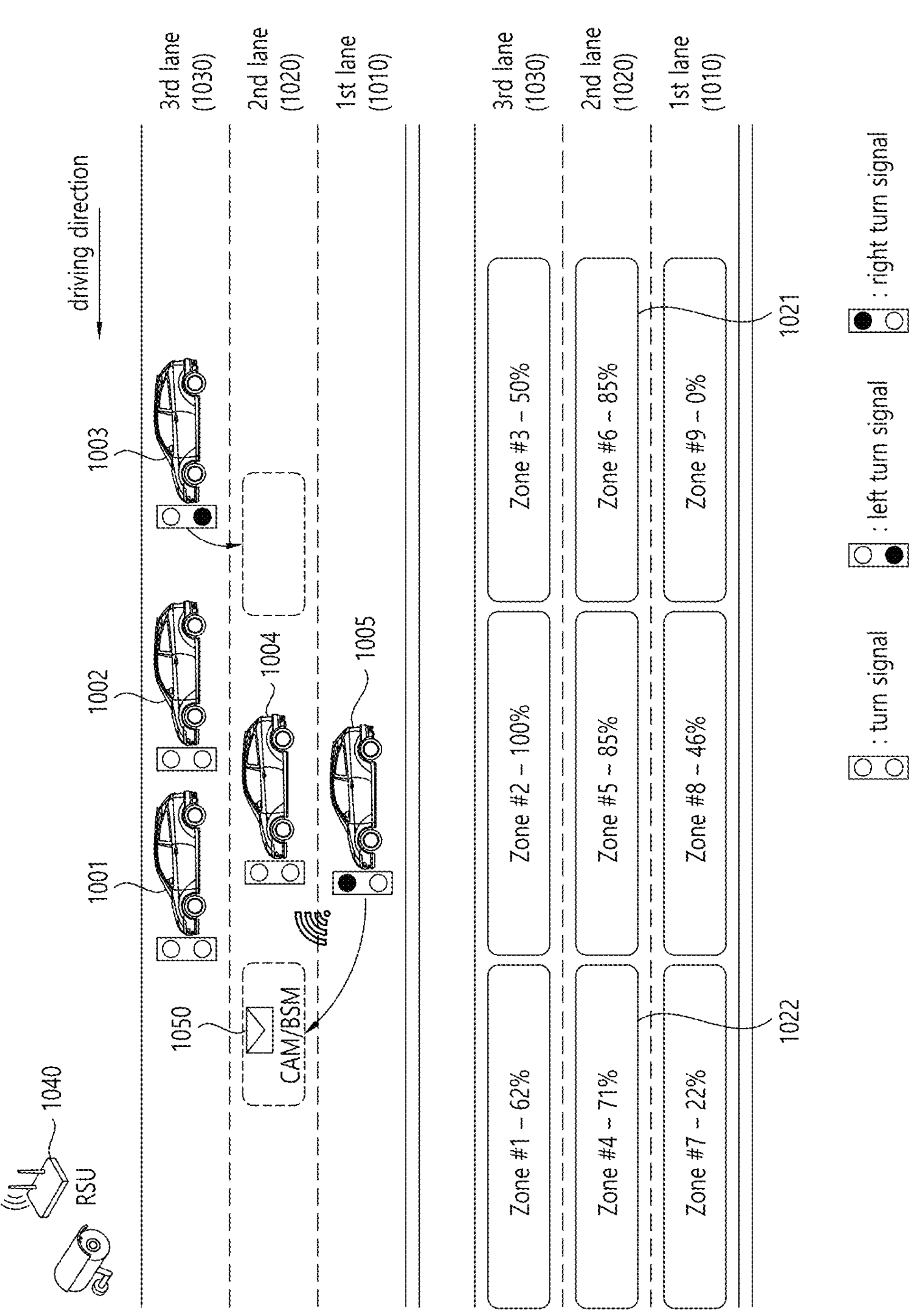
FIG. 10 shows a method for displaying road space occupancy possibility on a normal road, based on an embodiment of the present disclosure.

According to the method proposed in the present disclosure, the road space occupancy possibility according to driving states of the five vehicles 1001 to 1005 on the three-lane road 1010 to 1030 may be expressed as in FIG. 10.

FIG. 10 shows a method for displaying road space occupancy possibility on a normal road, based on an embodiment of the present disclosure. The embodiment of FIG. 10 may be combined with various embodiments of the present disclosure.

Referring to FIG. 10, there are two scenarios for changing lanes. First, for example, the RSU 1040 may detect with camera that the vehicle 1003 changes to the left lane (changes from the 3rd lane 1030 to the 2nd lane 1020), and based on this, configure the space occupancy possibility of the zone 1021 as high value and display it on the map. As a similar example, when the vehicle 1005 transmits V2X message (e.g., CAM or BSM, etc.) to change lanes from the 1st lane 1010 to the 2nd lane 1020, the space occupancy possibility of the zone 1022 may be displayed by adding the future space occupancy possibility to the current space occupancy possibility state (currently not occupied by a vehicle). For example, with the above information, two vehicles 1004 and 1005 may avoid a collision through the maneuver coordination. For example, when the vehicle 1005 capable of communicating with RSU 1040 attempts to change lanes, the RSU 1040 may identify the dynamic state and intention of the vehicles 1001 to 1005 and apply them to the space occupancy possibility function. For example, if the vehicle 1004 decelerates, the space occupancy possibility of the zone 1022 may be expressed as a low value because it has intention of yielding cutting-in of another vehicle 1005. For example, conversely, if the vehicle 1004 accelerates, the space occupancy possibility of the zone 1022 may increase because it has no intention of yielding cutting-in of another vehicle 1005. For example, as shown in FIG. 10, the space occupancy possibility of each zone of the road may be displayed as percentages, respectively. In this case, for example, the lowest space occupancy possibility may be displayed as 0%, and the highest space occupancy possibility may be displayed as 100%. Or, for example, the space occupancy possibility for each zone of the road may be displayed by color. Or, for example, the space occupancy possibility for each zone of the road may be displayed with a gradation of green color and red color. In this case, for example, the green color may display the lowest space occupancy possibility, and the red color may display the highest space occupancy possibility.

(2) a Method for Displaying the Road Space Occupancy Possibility on the Highway (Highway Entry Scenario)

FIG. 11 shows a method for displaying road space occupancy possibility on a highway, based on an embodiment of the present disclosure. The embodiment of FIG. 11 may be combined with various embodiments of the present disclosure.

Referring to FIG. 11, for example, the RSU 1140 installed on the highway on-ramp 1130 may display the space occupancy possibility of on-ramp zones 1121 and 1122 and 1131 by identifying information and driving intention of the vehicle 1101 entering the highway to the on-ramp, and information and driving intention of the vehicle 1102 driving on the 2nd lane 1120, as below. For example, the displaying of the space occupancy possibility of the on-ramp zones 1121 and 1122 and 1131 may be used as a criterion for entering vehicle 1101 to determine when to enter. For example, if the vehicle 1102 has intention to yield for the entering vehicle 1101 by decelerate, the on-ramp zone 1121 may have low space occupancy possibility. As another example, for example, since the vehicle 1103 has expressed intention to change to the left lane by turn signal, the space occupancy possibility of the zone 1123 of the 2nd lane 1120 may decrease, and the space occupancy possibility of the zone to move 1111 and 1112 of the 1st lane 1110 may increase. For example, as shown in FIG. 11, the space occupancy possibility for each zone of the road may be displayed as percentages, respectively. In this case, for example, the lowest space occupancy possibility may be displayed as 0%, and the highest space occupancy possibility may be displayed as 100%. Or, for example, the space occupancy possibility for each zone of the road may be displayed by color. Or, for example, the space occupancy possibility for each zone of the road may be displayed with a gradation of green color and red color. In this case, for example, the green color may display the lowest space occupancy possibility, and the red color may display the highest space occupancy possibility.

For example, similarly, in the case of the vehicle entering a highway, the road space occupancy possibility may be displayed by identifying driving intention, from turn signals, deceleration (intention to entering from the current exit), acceleration (intention to entering from the next exit), or V2X message, etc.

(3) a Method for Displaying the Road Space Occupancy Possibility on the Intersection In addition to the lane change scenario described above, the method proposed in the present disclosure may be applied and used in various case scenarios at the intersection. Specifically, for example, in the case of the other road users such as pedestrians (e.g., two-wheeled vehicles, etc.), the method proposed in the present disclosure may be applied and used.

Figure 12:
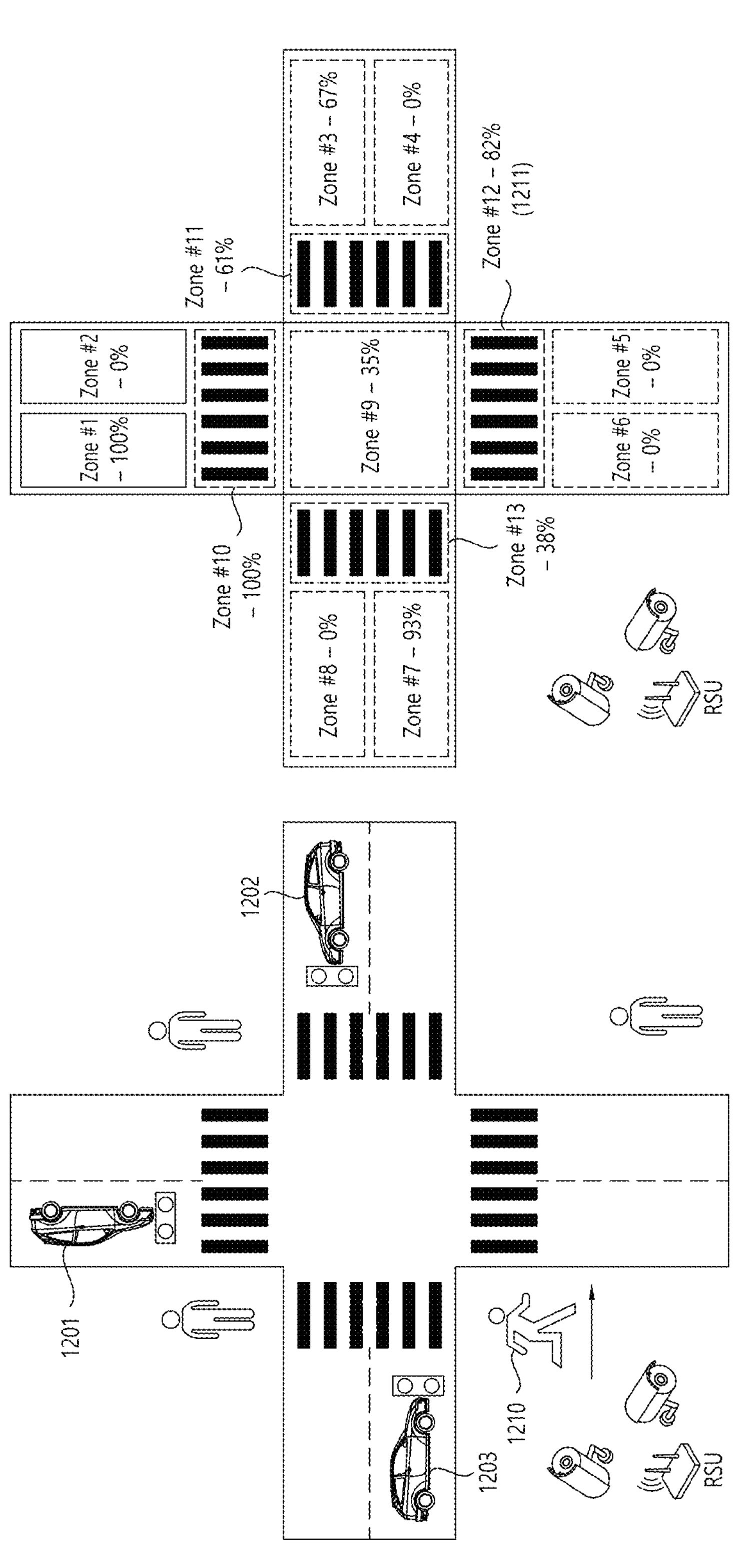
FIG. 12 shows a method for displaying road space occupancy possibility on an intersection, based on an embodiment of the present disclosure.

FIG. 12 shows a method for displaying road space occupancy possibility on an intersection, based on an embodiment of the present disclosure. The embodiment of FIG. 12 may be combined with various embodiments of the present disclosure.

Referring to FIG. 12, taking the left figure of FIG. 12 as an example, if a pedestrian 1210 walks toward a crosswalk at an intersection, the space occupancy possibility of the zone 1211 of the intersection may be calculated and displayed as the right figure of FIG. 12. For example, based on the above information, the vehicle 1203 may safely make a right turn at the intersection. In addition, for example, before a U-turn vehicle overlaps with a right-turn vehicle, or before a pedestrian crosses a crosswalk without a traffic light, the RSU may warn to road users by understanding the flow and informing prediction and possibility for the space occupancy. In addition, for example, signal information (e.g., signal phase and timing (SPaT)) may be represented by the display method in the present disclosure. For example, when a signal changes, the time before the signal changes (e.g., changes from green color to red color) may be represented by applying the display method proposed in the disclosure. For example, as shown in FIG. 12, the space occupancy possibility for each zone of the road may be displayed as percentages, respectively. In this case, for example, the lowest space occupancy possibility may be displayed as 0%, and the highest space occupancy possibility may be displayed as 100%. Or, for example, the space occupancy possibility for each zone of the road may be displayed by color. Or, for example, the space occupancy possibility for each zone of the road may be displayed with a gradation of green color and red color. In this case, for example, the green color may display the lowest space occupancy possibility, and the red color may display the highest space occupancy possibility.

FIG. 13 shows a flow chart of a method for displaying road space occupancy possibility, based on an embodiment of the present disclosure. The embodiment of FIG. 13 may be combined with various embodiments of the present disclosure.

According to various embodiments of the present disclosure, the method for displaying the road space occupancy proposed in the present disclosure may reduce the possibility of collision by considering the current space occupancy state and the near-future space occupancy possibility when the road user changes a driving path. That is, the road user receiving the road space occupancy possibility information may expect smooth traffic flows by easily recognizing the predicted road space occupancy state of the current and the future. For example, representatively, before changing the driving paths (e.g., lane changes, crossing an intersection, entering or exiting a junction, etc.) while the vehicles is driving, if the vehicles select or change driving paths based on the road space occupancy possibility displaying information proposed in the present disclosure, the collision accidents between vehicles may be prevented.

According to various embodiments of the present disclosure, when V2X is utilized in the present disclosure, the road space occupancy possibility information in the present disclosure may transferred through collective perception message (CPM) or sensor data sharing message (SDSM), and it may be utilized to use maneuver coordination service (MCS) or maneuver sharing coordination service (MSCS). For example, in the CPM or the SDSM, the possibility of collision may be represented regardless of the number of objects on the road, and the data size of the message may be reduced by the method proposed in the present disclosure compared to the method of representing each object, and the computing resource for the object classification may be saved. For example, in the MCS or the MSCS, the vehicle capable of V2X communication may change driving path, or receive guidance for avoiding the vehicles unable to communicate on the road with high risk of collisions, based on the method proposed in the present disclosure.

Figure 14:
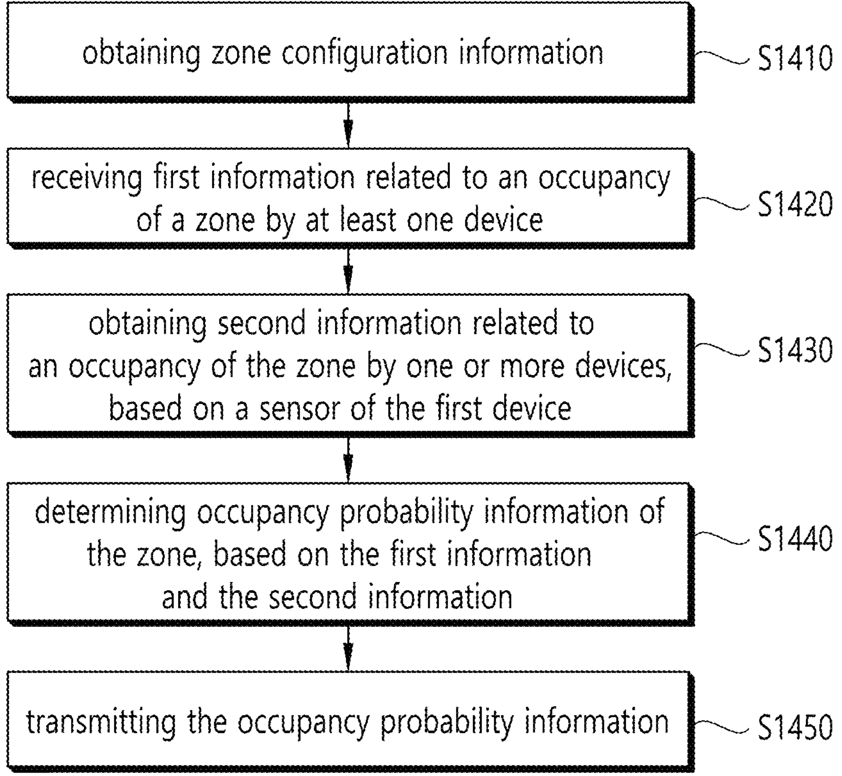
FIG. 14 shows a method for performing wireless communication by a first device, based on an embodiment of the present disclosure.

FIG. 14 shows a method for performing wireless communication by a first device, based on an embodiment of the present disclosure. The embodiment of FIG. 14 may be combined with various embodiments of the present disclosure.

Referring to FIG. 14, In step S1410, a first device may obtain zone configuration information. In step S1420, the first device may receive first information related to an occupancy of a zone by at least one device. In step S1430, the first device may obtain second information related to an occupancy of the zone by one or more devices, based on a sensor of the first device. In step S1440, the first device may determine occupancy probability information of the zone, based on the first information and the second information. In step S1450, the first device may transmit the occupancy probability information.

For example, the first information may be received from the at least one device through an awareness message. For example, the first information may include first static information related to the at least one device, and the first static information may include information related to a size or a type of the at least one device. For example, the first information may include first dynamic information related to the at least one device and the first dynamic information may include information related to a velocity, an acceleration, a position, a direction, a driving intention, a predicted driving intention, a predicted driving path or a planned driving path of the at least one device.

For example, the first information may be received from an external server including a traffic information center server. For example, the first information may include at least one of signal phase and timing information of a traffic light system, high definition map information, traffic condition information or road management information.

For example, the second information may include second static information related to the one or more devices, and the second static information may include at least one of information related to parking or stopping of the one or more devices, or information related to a type of the one or more devices.

For example, the second information may include second dynamic information related to the one or more devices, and the second dynamic information may include at least one of acceleration information, deceleration information or direction information of the one or more devices.

For example, the occupancy probability information may be determined by summing a value related to current occupancy possibility of the zone multiplied by a first weight and a value related to future occupancy possibility of the zone multiplied by a second weight, and the value related to current occupancy possibility and the value related to future occupancy possibility may be generated based on the first information or the second information, and a sum of the first weight and the second weight may be 1, and the second weight may be greater than or equal to 0 and less than or equal to 1, and the second weight may be determined based on property of the zone or driving environment of the at least one device.

For example, the occupancy probability information may be determined based on being quantified as a percentage.

For example, the occupancy probability information may be transmitted to the at least one device or the one or more devices, through a vehicle-to-everything (V2X) message. For example, the V2X message may include at least one of a sensor data sharing message (SDSM) or a collective perception message (CPM)

For example, the zone may be configured based on the zone configuration information.

And, the zone configuration information may include at least one of (i) statistical information related to the at least one device or the one or more devices or (ii) information related to property of the zone.

The proposed method may be applied to devices according to various embodiments of the present disclosure. First, a processor 102 of a first device 100 may control a transceiver 106 to obtain zone configuration information. And, the processor 102 of the first device 100 may control the transceiver 106 to receive first information related to an occupancy of a zone by at least one device. And, the processor 102 of the first device 100 may control the transceiver 106 to obtain second information related to an occupancy of the zone by one or more devices, based on a sensor of the first device. And, the processor 102 of the first device 100 may determine occupancy probability information of the zone, based on the first information and the second information. And, the processor 102 of the first device 100 may control the transceiver 106 to transmit the occupancy probability information.

According to one embodiment of the present disclosure, provided is a first device configured to perform wireless communication. The first device may comprise: at least one transceiver; at least one processor; and at least one memory connected to the at least one processor and storing instructions. For example, the instructions, based on being executed by the at least one processor, cause the first device to perform operations comprising: obtaining zone configuration information; receiving first information related to an occupancy of a zone by at least one device; obtaining second information related to an occupancy of the zone by one or more devices, based on a sensor of the first device; determining occupancy probability information of the zone, based on the first information and the second information; and transmitting the occupancy probability information.

According to one embodiment of the present disclosure, provided is a processing device configured to control a first device. The processing device may comprise: at least one processor; and at least one memory connected to the at least one processor and storing instructions. For example, the instructions, based on being executed by the at least one processor, cause the first device to perform operations comprising: obtaining zone configuration information; receiving first information related to an occupancy of a zone by at least one device; obtaining second information related to an occupancy of the zone by one or more devices, based on a sensor of the first device; determining occupancy probability information of the zone, based on the first information and the second information; and transmitting the occupancy probability information.

According to one embodiment of the present disclosure, provided is a non-transitory computer-readable storage medium recording instructions. For example, the instructions, based on being executed, cause a first device to perform operations comprising: obtaining zone configuration information; receiving first information related to an occupancy of a zone by at least one device; obtaining second information related to an occupancy of the zone by one or more devices, based on a sensor of the first device; determining occupancy probability information of the zone, based on the first information and the second information; and transmitting the occupancy probability information.

Figure 15:
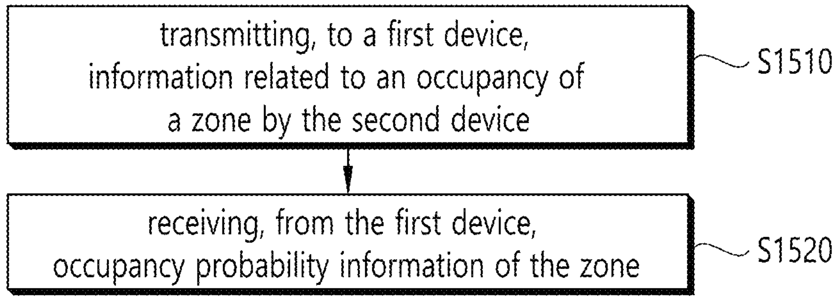
FIG. 15 shows a method for performing wireless communication by a second device, based on an embodiment of the present disclosure.

FIG. 15 shows a method for performing wireless communication by a second device, based on an embodiment of the present disclosure. The embodiment of FIG. 15 may be combined with various embodiments of the present disclosure.

Referring to FIG. 15, In step S1510, a second device may transmit, to a first device, information related to an occupancy of a zone by the second device. In step S1520, the second device may receive, from the first device, occupancy probability information of the zone. For example, the occupancy probability information may be determined based on first information related to an occupancy of the zone by at least one device including the second device, and second information related to an occupancy of the zone by one or more devices based on a sensor of the first device.

The proposed method may be applied to devices according to various embodiments of the present disclosure. First, a processor 202 of a second device 200 may control a transceiver 206 to transmit, to a first device, information related to an occupancy of a zone by the second device. And, the processor 202 of the second device 200 may control the transceiver 206 to receive, from the first device, occupancy probability information of the zone. For example, the occupancy probability information may be determined based on first information related to an occupancy of the zone by at least one device including the second device, and second information related to an occupancy of the zone by one or more devices based on a sensor of the first device.

According to one embodiment of the present disclosure, provided is a second device configured to perform wireless communication. The second device may comprise: at least one transceiver; at least one processor; and at least one memory connected to the at least one processor and storing instructions. For example, the instructions, based on being executed by the at least one processor, cause the second device to perform operations comprising: transmitting, to a first device, information related to an occupancy of a zone by the second device; and receiving, from the first device, occupancy probability information of the zone. For example, the occupancy probability information is determined based on first information related to an occupancy of the zone by at least one device including the second device, and second information related to an occupancy of the zone by one or more devices based on a sensor of the first device.

According to one embodiment of the present disclosure, provided is a processing device configured to control a second device. The processing device may comprise: at least one processor; and at least one memory connected to the at least one processor and storing instructions. For example, the instructions, based on being executed by the at least one processor, cause the second device to perform operations comprising: transmitting, to a first device, information related to an occupancy of a zone by the second device; and receiving, from the first device, occupancy probability information of the zone. For example, the occupancy probability information is determined based on first information related to an occupancy of the zone by at least one device including the second device, and second information related to an occupancy of the zone by one or more devices based on a sensor of the first device.

According to one embodiment of the present disclosure, provided is a non-transitory computer-readable storage medium recording instructions. For example, the instructions, based on being executed, cause a second device to perform operations comprising: transmitting, to a first device, information related to an occupancy of a zone by the second device; and receiving, from the first device, occupancy probability information of the zone. For example, the occupancy probability information is determined based on first information related to an occupancy of the zone by at least one device including the second device, and second information related to an occupancy of the zone by one or more devices based on a sensor of the first device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
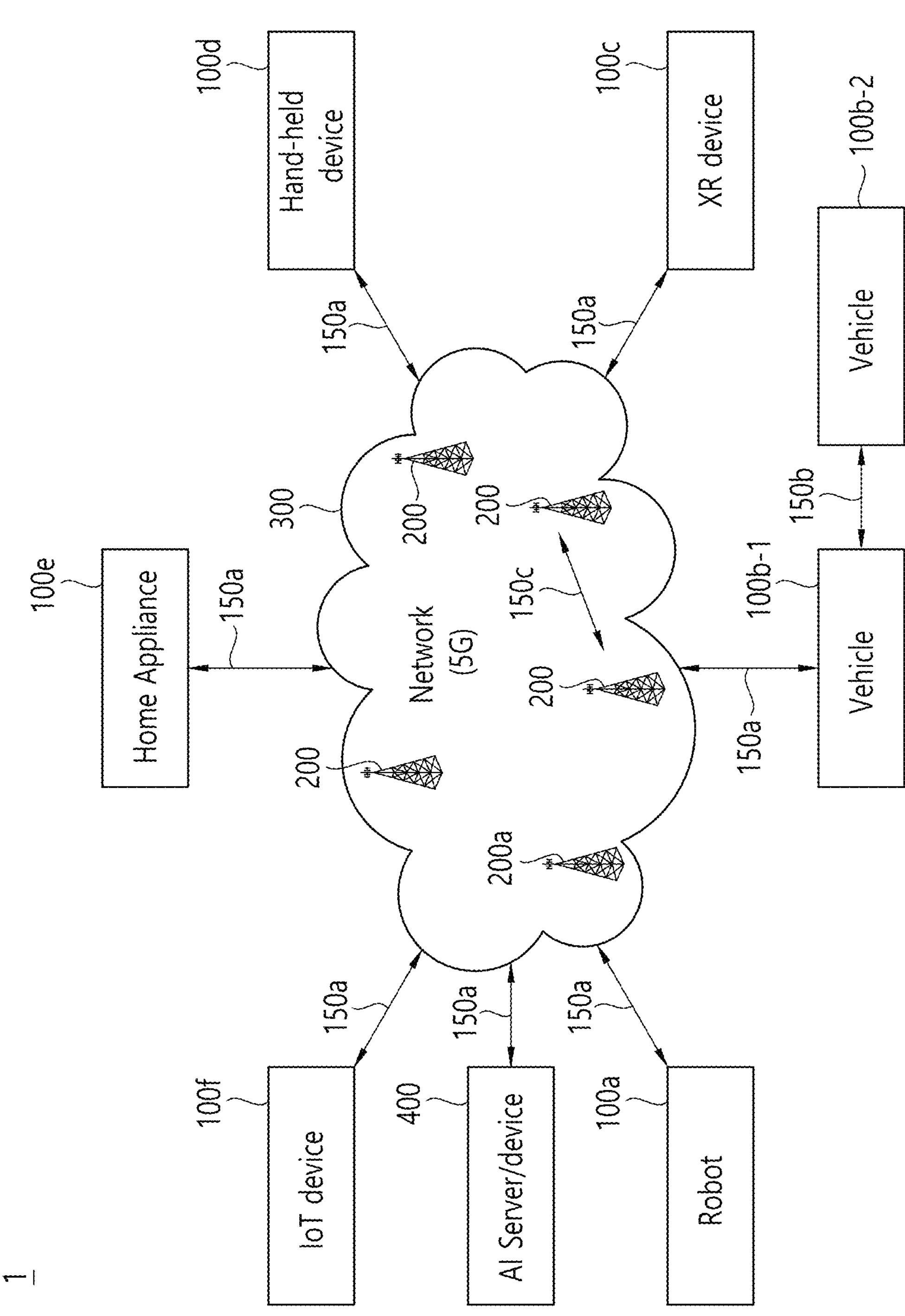
FIG. 16 shows a communication system 1, based on an embodiment of the present disclosure.

FIG. 16 shows a communication system 1, based on an embodiment of the present disclosure. The embodiment of FIG. 16 may be combined with various embodiments of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
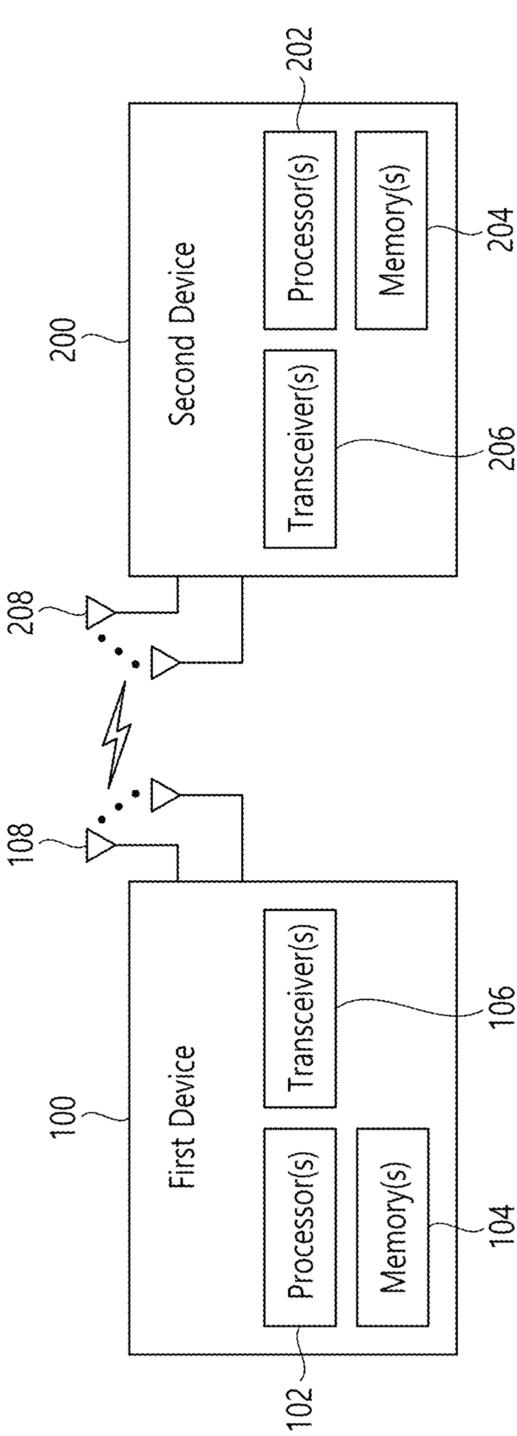
FIG. 17 shows wireless devices, based on an embodiment of the present disclosure.

FIG. 17 shows wireless devices, based on an embodiment of the present disclosure. The embodiment of FIG. 17 may be combined with various embodiments of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
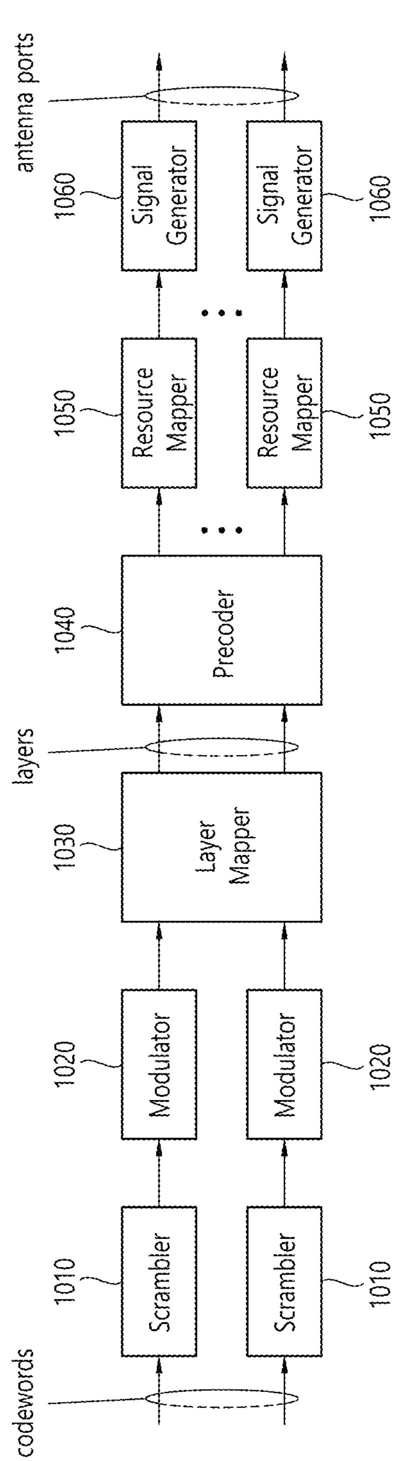
FIG. 18 shows a signal process circuit for a transmission signal, based on an embodiment of the present disclosure.

FIG. 18 shows a signal process circuit for a transmission signal, based on an embodiment of the present disclosure. The embodiment of FIG. 18 may be combined with various embodiments of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
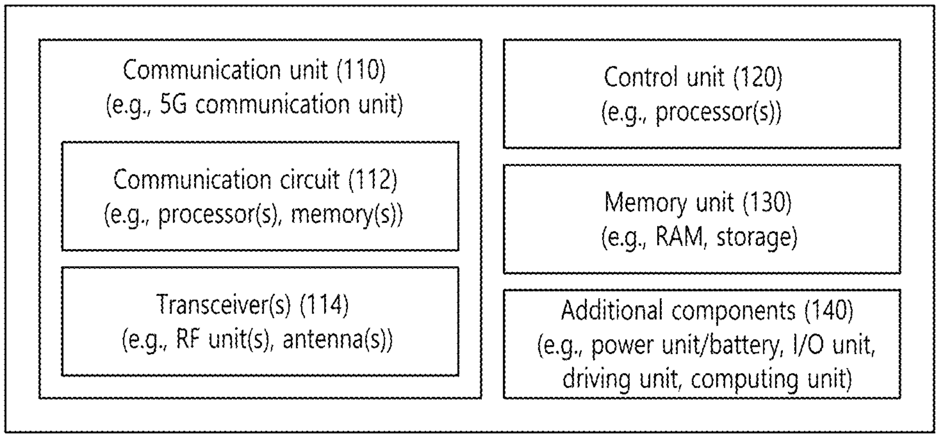
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16). The embodiment of FIG. 19 may be combined with various embodiments of the present disclosure.

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (**100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16**), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit

120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
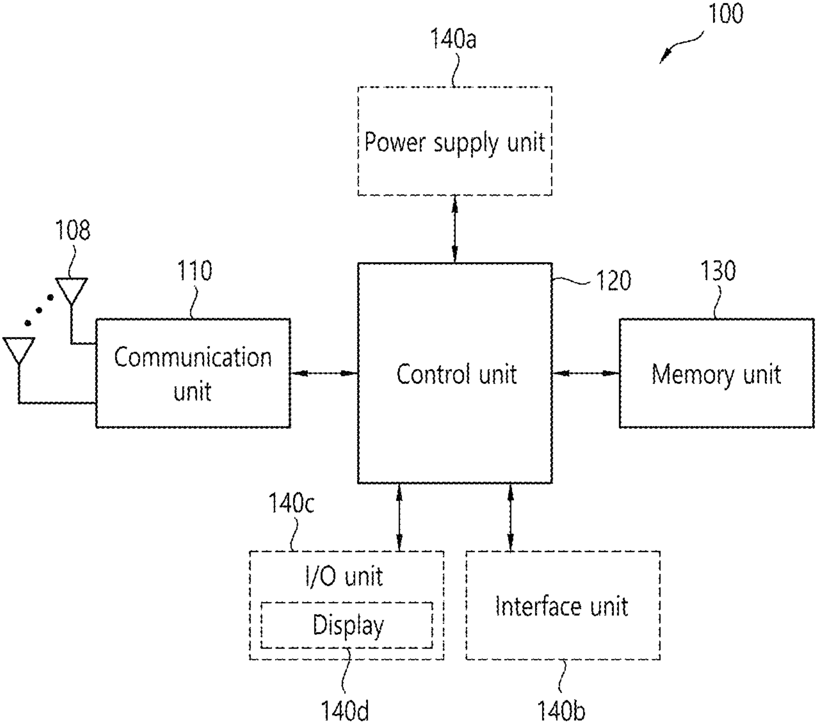
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 20 may be combined with various embodiments of the present disclosure.

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 21 may be combined with various embodiments of the present disclosure.

Referring to FIG. 21, a vehicle or autonomous vehicle 100 may include an antenna unit 108, a communication unit 110, a control unit 120, a driving unit 140*e*, a power supply unit 140*f*, a sensor unit 140*g*, and an autonomous driving unit 140*h*. The antenna unit 108 may be configured as a part of the communication unit 110. The blocks 110/130/140*e* to 140 h correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*e* may cause the vehicle or the autonomous vehicle 100 to drive on a road. The driving unit 140*e* may include an engine, a motor, a powertrain, a wheel, a brake, a steering device, etc. The power supply unit 140*f* may supply power to the vehicle or the autonomous vehicle 100 and include a wired/wireless charging circuit, a battery, etc. The sensor unit 140*g* may acquire a vehicle state, ambient environment information, user information, etc. The sensor unit 140*g* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*h* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*h* may generate an autonomous driving path and a driving plan from the obtained data. The control unit 120 may control the driving unit 140*e* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*g* may obtain a vehicle state and/or surrounding environment information. The autonomous driving unit 140*h* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

obtaining, by a first device, zone configuration information;

receiving, by the first device, from a second device, first information related to an occupancy of a zone by the second device;

obtaining, by the first device, based on a sensor of the first device, second information related to an occupancy of the zone by at least one device including the second device;

generating, by the first device, based on the first information and the second information, a value related to current occupancy possibility of the zone and a value related to future occupancy possibility of the zone;

determining, by the first device, occupancy probability information of the zone based on a weighted sum of the value related to current occupancy possibility of the zone and the value related to future occupancy possibility of the zone; and transmitting, by the first device, the occupancy probability information.

2. The method of claim 1, wherein the first information is received from the second device through an awareness message.

3. The method of claim 2, wherein the first information includes first static information related to the second device, and wherein the first static information includes information related to a size or a type of the second device.

4. The method of claim 2, wherein the first information includes first dynamic information related to the second device, and wherein the first dynamic information includes information related to a velocity, an acceleration, a position, a direction, a driving intention, a predicted driving intention, a predicted driving path or a planned driving path of the second device.

5. The method of claim 1, wherein the first information is received, by the second device, from an external server including a traffic information center server, and wherein the first information is transmitted from the second device to the first device.

6. The method of claim 5, wherein the first information includes at least one of signal phase and timing information of a traffic light system, high definition map information, traffic condition information or road management information.

7. The method of claim 1, wherein the second information includes second static information related to the at least one device, and wherein the second static information includes at least one of information related to parking or stopping of the at least one device, or information related to a type of the at least one device.

8. The method of claim 1, wherein the second information includes second dynamic information related to the at least one device, and wherein the second dynamic information includes at least one of acceleration information, deceleration information or direction information of the at least one device.

9. The method of claim 1, wherein the weighted sum is determined by summing the value related to current occupancy possibility of the zone multiplied by a first weight and the value related to future occupancy possibility of the zone multiplied by a second weight, wherein a sum of the first weight and the second weight is 1, wherein the second weight is greater than or equal to 0 and less than or equal to 1, and wherein the second weight is determined based on at least one of a property of the zone or a driving environment of the at least one device.

10. The method of claim 1, wherein the occupancy probability information is determined based on being quantified as a percentage.

11. The method of claim 1, wherein the occupancy probability information is transmitted to the at least one device, through a vehicle-to-everything (V2X) message.

12. The method of claim 11, wherein the V2X message includes at least one of a sensor data sharing message (SDSM) or a collective perception message (CPM).

13. The method of claim 1, wherein the zone is configured based on the zone configuration information, and wherein the zone configuration information includes at least one of (i) statistical information related to the at least one device, or (ii) information related to property of the zone.

14. A first device comprising:

at least one transceiver;

at least one processor; and at least one memory connected to the at least one processor and storing instructions that, based on being executed, cause the first device to perform operations comprising:

obtaining zone configuration information;

receiving, from a second device, first information related to an occupancy of a zone by the second device;

obtaining, based on a sensor of the first device, second information related to an occupancy of the zone by at least one device including the second device;

generating, by the first device, based on the first information and the second information, a value related to current occupancy possibility of the zone and a value related to future occupancy possibility of the zone;

determining occupancy probability information of the zone based on a weighted sum of the value related to current occupancy possibility of the zone and the value related to future occupancy possibility of the zone; and transmitting the occupancy probability information.

15. The first device of claim 14, wherein the first information is received from the second device through an awareness message.

16. The first device of claim 14, wherein the weighted sum is determined by summing the value related to current occupancy possibility of the zone multiplied by a first weight and the value related to future occupancy possibility of the zone multiplied by a second weight.

17. The first device of claim 14, wherein the zone is configured based on the zone configuration information, and wherein the zone configuration information includes at least one of (i) statistical information related to the at least one device, or (ii) information related to property of the zone.

18. A processing device adapted to control a first device to perform wireless communication, the processing device comprising:

at least one processor; and at least one memory connected to the at least one processor and storing instructions that, based on being executed, cause the at least one processor to perform operations comprising:

obtaining zone configuration information;

receiving, from a second device, first information related to an occupancy of a zone by the second device;

obtaining, based on a sensor of the first device, second information related to an occupancy of the zone by at least one device including the second device;

generating, by the first device, based on the first information and the second information, a value related to current occupancy possibility of the zone and a value related to future occupancy possibility of the zone:

determining occupancy probability information of the zone, based on a weighted sum of the value related to current occupancy possibility of the zone and the value related to future occupancy possibility of the zone; and transmitting the occupancy probability information.

19. The processing device of claim 18, wherein the weighted sum is determined by summing the value related to current occupancy possibility of the zone multiplied by a first weight and the value related to future occupancy possibility of the zone multiplied by a second weight.

20. The processing device of claim 18, wherein the zone is configured based on the zone configuration information, and wherein the zone configuration information includes at least one of (i) statistical information related to the at least one device, or (ii) information related to property of the zone.

* * * * *